United States Patent
Park et al.

(10) Patent No.: US 11,683,818 B2
(45) Date of Patent: Jun. 20, 2023

(54) OPERATION METHOD OF COMMUNICATION NODE IN MILLIMETER WAVE BASED COMMUNICATION SYSTEM

(71) Applicant: ELECTRONICS AND TELECOMMUNICATIONS RESEARCH INSTITUTE, Daejeon (KR)

(72) Inventors: Soon Gi Park, Daejeon (KR); Yong Seouk Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/486,498

(22) Filed: Sep. 27, 2021

(65) Prior Publication Data
US 2022/0015094 A1    Jan. 13, 2022

Related U.S. Application Data

(62) Division of application No. 15/919,808, filed on Mar. 13, 2018, now Pat. No. 11,153,865.

(30) Foreign Application Priority Data

Mar. 15, 2017    (KR) .......................... 10-2017-0032445

(51) Int. Cl.
*H04W 72/27*    (2023.01)
*H04W 24/02*    (2009.01)
(Continued)

(52) U.S. Cl.
CPC ........... *H04W 72/27* (2023.01); *H04W 24/02* (2013.01); *H04W 36/0066* (2013.01);
(Continued)

(58) Field of Classification Search
CPC ............ H04W 24/02; H04W 36/0055; H04W 36/0066; H04W 36/0072; H04W 36/0077;
(Continued)

(56) References Cited

U.S. PATENT DOCUMENTS 9,337,969 B2    5/2016  Raghavan et al.
9,392,519 B2    7/2016  Zhu
(Continued)

FOREIGN PATENT DOCUMENTS

KR    20150045211 A  *  4/2015

OTHER PUBLICATIONS

Ericsson, "Procedure for secondary node change", 3GPP TSG-RAN WG2 Meeting #97, R2-1700920, Feb. 4, 2017. <http://www.3gpp.org/ftp/tsg_ran/WG2_RL2/TSGR2_97/Docs/R2-01786.zip >.
(Continued)

*Primary Examiner* — Khoa Huynh
(74) *Attorney, Agent, or Firm* — Rabin & Berdo, P.C.

(57) ABSTRACT

An operation method of a communication node in a millimeter-wave based communication system may comprise when a first communication path between the second base station and the terminal connected to the first base station is not established, transmitting a radio resource control (RRC) request message requesting establishment of the first communication path to the second base station via the first base station; receiving an RRC response message from the second base station via the first base station, the RRC response message being a response to the RRC request message; and establishing the first communication path based on the RRC response message.

6 Claims, 24 Drawing Sheets

(51) Int. Cl.
  *H04W 36/00*  (2009.01)
  *H04W 72/21*  (2023.01)
  *H04W 72/51*  (2023.01)
  *H04W 76/19*  (2018.01)
  *H04W 88/08*  (2009.01)

(52) U.S. Cl.
  CPC ....... *H04W 36/0072* (2013.01); *H04W 72/21* (2023.01); *H04W 72/51* (2023.01); *H04W 36/0055* (2013.01); *H04W 76/19* (2018.02); *H04W 88/085* (2013.01)

(58) Field of Classification Search
  CPC ......... H04W 72/0413; H04W 72/0426; H04W 72/048; H04W 76/19; H04W 88/085; H04W 24/10; H04W 72/21; H04W 72/27; H04W 72/51; H04W 76/12; H04W 76/15; H04W 76/27; H04W 92/20
  See application file for complete search history.

(56) References Cited

U.S. PATENT DOCUMENTS

| | | | |
|---|---|---|---|
| 9,414,285 | B2 | 8/2016 | Hampel et al. |
| 2011/0032889 | A1 | 2/2011 | Lee et al. |
| 2012/0108231 | A1* | 5/2012 | Watanabe ........... H04L 43/0852 455/423 |
| 2014/0313973 | A1 | 10/2014 | Park et al. |
| 2015/0264621 | A1* | 9/2015 | Sivanesan ......... H04W 36/0069 455/436 |
| 2015/0326359 | A1 | 11/2015 | Subramanian et al. |
| 2015/0373600 | A1 | 12/2015 | Malkamäki et al. |
| 2016/0007243 | A1 | 1/2016 | Park et al. |
| 2016/0100347 | A1* | 4/2016 | Ryu ..................... H04L 45/245 455/445 |
| 2016/0192400 | A1 | 6/2016 | Sohn et al. |
| 2016/0192401 | A1 | 6/2016 | Park et al. |
| 2016/0309305 | A1 | 10/2016 | Wilhelmsson et al. |
| 2016/0353510 | A1 | 12/2016 | Zhang et al. |
| 2017/0289025 | A1 | 10/2017 | Cheng et al. |
| 2018/0352481 | A1* | 12/2018 | Taguchi ........... H04W 36/0011 |
| 2019/0124708 | A1 | 4/2019 | Shi et al. |
| 2019/0159273 | A1 | 5/2019 | Shi et al. |

OTHER PUBLICATIONS

Qualcomm Incorporated, "Considerations on SgNB RRM handling", 3GPP TSG-RAN WG2 Meeting #97, R2-1701786, Feb. 4, 2017. < http://www.3gpp.org/ftp/tsg_ran/WG2_RL2/TSGR2_97/Docs/R2-01786.zip >.

* cited by examiner

OPERATION METHOD OF COMMUNICATION NODE IN MILLIMETER WAVE BASED COMMUNICATION SYSTEM

CROSS-REFERENCE TO RELATED APPLICATIONS

This application is a division of U.S. application Ser. No. 15/919,808, filed on Mar. 13, 2018 (allowed on Jun. 28, 2021), which claims priority under 35 U.S.C. § 119 of Korean Patent Application No. 10-2017-0032445 filed on Mar. 15, 2017 in the Korean Intellectual Property Office (KIPO), the entire contents of which are hereby incorporated by reference.

BACKGROUND

1. Technical Field

The present disclosure relates to a technology for operating a communication system, and more specifically, to a technology for operating a millimeter wave based communication system.

2. Related Art

In a mobile communication system, a terminal (e.g., user equipment (UE)) may transmit and receive data units through a base station. For example, if there is a data unit to be transmitted to a second terminal, a first terminal may generate a message including the data unit to be transmitted to the second terminal, and transmit the generated message to a first base station. The first base station may then receive the message from the first terminal and confirm that a destination of the received message is the second terminal. The first base station may transmit the message to a second base station to which the second terminal, which is the confirmed destination, is connected. The second base station may then receive the message from the first base station and confirm that the destination of the received message is the second terminal. The second base station may transmit the message to the second terminal, which is the confirmed destination. The second terminal may receive the message from the second base station and obtain the data unit included in the received message.

Such the mobile communication system may support a conventional cellular frequency band (e.g., a frequency band of less than 3 gigahertz (GHz)) and a millimeter wave (mmWave) band (e.g., a frequency band of 30 GHz or more). For example, the mobile communication system may include a base station supporting the conventional cellular frequency band (hereinafter referred to as an 'eNB'), a base station supporting the millimeter wave band (hereinafter referred to as 'gNB'), and the like. In this case, the coverage of the mobile communication system may be provided by the eNB, and the increased capacity of the communication system may be provided by the gNB. Alternatively, the coverage and capacity of the mobile communication system may be provided by the gNB. When the gNB is introduced to the mobile communication system, new technologies for operating the mobile communication system will be required.

SUMMARY

Accordingly, embodiments of the present disclosure provide a method of operating a millimeter wave based communication system.

In order to achieve the objective of the present disclosure, an operation method of a terminal in a communication system including the terminal, a first base station, and a second base station may comprise when a first communication path between the second base station and the terminal connected to the first base station is not established, transmitting a radio resource control (RRC) request message requesting establishment of the first communication path to the second base station via the first base station; receiving an RRC response message from the second base station via the first base station, the RRC response message being a response to the RRC request message; and establishing the first communication path based on the RRC response message. Also, the RRC request message may be transmitted from the first base station to the second base station via a second communication path established between the first base station and the second base station, the RRC response message may be generated by the second base station based on the RRC request message, and the RRC response message may be transmitted from the second base station to the first base station via the second communication path.

The RRC response message may include at least one of connection setup information and connection reconfiguration information.

The communications between the terminal and the first base station may be performed using a frequency band other than a millimeter wave band, and the communications between the terminal and the second base station may be performed using the millimeter wave band.

When the first communication path is established, at least one data radio bearer (DRB) between the terminal and the second base station and at least one general packet radio service (GPRS) tunneling protocol (GTP)-U tunnel between the second base station and an evolved packet core (EPC) of the communication system may be established.

The second communication path may be mapped to a data radio bearer (DRB) established between the terminal and the first base station, and the RRC request message and the RRC response message may be transmitted and received through the DRB.

The communications between the first base station and the second base station may be performed based on user datagram protocol (UDP).

The first base station and the second base station may be connected to a same evolved packet core (EPC).

The operation method may further comprise transmitting an RRC connection reconfiguration complete message indicating completion of the establishment of the first communication path to the second base station via the first base station. Also, the RRC connection reconfiguration message may be transmitted from the first base station to the second base station via the second communication path.

In order to achieve the objective of the present disclosure, an operation method of a terminal in a communication system including the terminal, a first base station, and a second base station may comprise when a primary cell is configured between the second base station and the terminal connected to the first base station, transmitting a first radio resource control (RRC) measurement report message including first channel state information measured by the terminal to the second base station via the first base station; when a secondary cell between the terminal and the second base station is determined to be added based on the first RRC measurement report message, receiving a first RRC connection reconfiguration message indicating addition of the secondary cell from the second base station via the first base station; and configuring the secondary cell based on the first RRC connection reconfiguration message. Also, the first RRC measurement report message may be transmitted from the first base station to the second base station via a communication path established between the first base station and the second base station, the first RRC connection reconfiguration message may be generated by the second base station, and the first RRC connection reconfiguration message may be transmitted from the second base station to the first base station via the communication path.

The communications between the terminal and the first base station may be performed using a frequency band other than a millimeter wave band, and the communications between the terminal and the second base station may be performed using the millimeter wave band.

The communication path may be mapped to a data radio bearer (DRB) established between the terminal and the first base station, and the first RRC measurement report message and the first RRC connection reconfiguration message may be transmitted and received through the DRB.

The communications between the first base station and the second base station may be performed based on user datagram protocol (UDP).

The operation method may further comprise transmitting an RRC connection reconfiguration complete message indicating completion of the configuration of the secondary cell to the second base station via the first base station. Also, the RRC connection reconfiguration message may be transmitted from the first base station to the second base station via the communication path.

The operation method may further comprise transmitting a second RRC measurement report message including second channel state information measured by the terminal to the second base station via the first base station; when the secondary cell is determined to be released based on the second RRC measurement report message, receiving a second RRC connection reconfiguration message indicating release of the secondary cell from the second base station via the first base station; and releasing the secondary cell based on the second RRC connection reconfiguration message. Also, the second RRC measurement report message may be transmitted from the first base station to the second base station via the communication path, the second RRC connection reconfiguration message may be generated by the second base station, and the second RRC connection reconfiguration message may be transmitted from the second base station to the first base station via the communication path.

In order to achieve the objective of the present disclosure, an operation method of a terminal in a communication system including the terminal, a first base station, a second base station, and a third base station may comprise when the terminal is connected to the first base station and the second base station, transmitting a radio resource control (RRC) measurement report message including channel state information measured by the terminal to the second base station via the first base station; when a handover procedure from the second base station to the third base station is determined to be performed based on the RRC measurement report message, receiving an RRC connection reconfiguration message indicating execution of the handover procedure from the second base station via the first base station; and establishing a first communication path between the terminal and the third base station by performing the handover procedure based on the RRC connection reconfiguration message. Also, the RRC measurement report message may be transmitted from the first base station to the second base station via a second communication path established between the first base station and the second base station, the RRC connection reconfiguration message may be generated by the second base station, and the RRC connection reconfiguration message may be transmitted from the second base station to the first base station via the second communication path.

The operation method may further comprise transmitting an RRC connection reconfiguration complete message indicating completion of the handover procedure to the third base station via the first base station. Also, the RRC connection reconfiguration message may be transmitted from the first base station to the third base station via a third communication path established between the first base station and the third base station.

The communications between the terminal and the first base station may be performed using a frequency band other than a millimeter wave band, and the communications between the terminal and the second base station and the communications between the terminal and the third base station may be performed using the millimeter wave band.

When the first communication path is established, at least one data radio bearer (DRB) between the terminal and the third base station and at least one general packet radio service (GPRS) tunneling protocol (GTP)-U tunnel between the third base station and an evolved packet core (EPC) of the communication system may be established.

The second communication path may be mapped to a data radio bearer (DRB) established between the terminal and the first base station, and the RRC measurement report message and the RRC connection reconfiguration message may be transmitted and received through the DRB.

The communications between the first base station and the second base station and the communications between the first base station and the third base station may be performed based on user datagram protocol (UDP).

According to the embodiments of the present disclosure, a base station supporting a conventional cellular frequency band (i.e., 'eNB') can provide an extended coverage for a communication system, and a base station supporting a millimeter wave band (i.e., 'gNB') can provide an enhanced capacity for the communication system. Also, even when the gNB is introduced into the communication system, operational changes in the communication system can be minimized.

For example, RRC messages of the gNB in the communication system comprising the eNB, the gNB, a UE, and the like may be transmitted and received through a communication path between the gNB and the eNB and a communication path between the eNB and the UE. Accordingly, an initial access procedure between the gNB and the UE, a cell configuration procedure of the gNB, a handover procedure of the gNB, an RLF recovery procedure of the gNB, and the like can be efficiently performed, and operational changes in the communication system can be minimized. As a result, the performance of the communication system can be remarkably improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
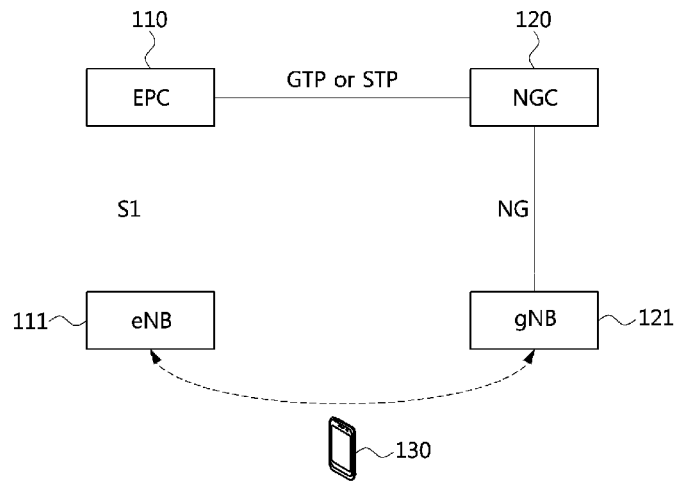
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first embodiment of a communication system.

Referring to FIG. 1, a communication system may comprise an evolved packet core (EPC) 110, an eNB 111, a new generation core (NGC) 120, a gNB 121, a user equipment (UE), and the like. The EPC 110 may be referred to as an 'EPC network', the NGC 120 may be referred to as an 'NGC', each of the eNB 111 and the gNB 121 may be referred to as a 'base station', and the UE 130 may be referred to as a 'terminal'. Also, the communication system shown in FIG. 1 may be referred to as a 'communication system A'.

In the communication system A, each of the EPC 110 and the NGC 120 may operate independently. The EPC 110 may support 4G communication technologies (e.g., long term evolution (LTE) technology, LTE-Advanced (LTE-A) technology, etc.) and may include at least one mobility management entity (MME), at least one gateway (GW), and the like. Also, the at least one GW may include a serving gateway (S-GW), a packet data network (PDN) gateway (P-GW), and the like. The eNB 111 may support the 4G communication technology and the communications between the eNB 111 and the EPC 110 may be performed based on an S1 interface. The S1 interface may include an S1-C interface (e.g., S1-MME interface) and an S1-U interface. The communications between the eNB 111 and the MME may be performed based on the S1-C interface, and the communications between the eNB 111 and the S-GW may be performed based on the S1-U interface.

The NGC 120 may support 5G communication technologies (e.g., millimeter wave (mmWave) based communication technology, new radio (NR) communication technology, etc.) and may include at least one NG-C, at least one NG-U, and the like. The NG-C may support the same or similar functions as the functions of the MME of the EPC 110, and the NG-U may support the same or similar functions as the functions of the S-GW of the EPC 110. Also, the NGC 120 may support backward compatibility for the EPC 110. The communications between the EPC 110 and the NGC 120 may be performed using a general packet radio service (GPRS) tunneling protocol (GTP) interface (e.g., a GTP-C interface) or a session tunnel protocol (STP) interface (e.g., STP-C interface). The GTP interface may include the GTP-C interface and a GTP-U interface. The STP interface may be an interface supporting the 5G communication technology, and may include the STP-C interface and an STP-U interface.

As a control interface (e.g., control plane) between the EPC 110 and the NGC 120, the MME of the EPC 110 may support the STP-C interface, or the NG-C of the NGC 120 may support the GTP-C interface. As a user interface (e.g., user plane) between the EPC 110 and the NGC 120, the MME (or GW) of the EPC 110 may support the STP-U interface, or the NG-C (or NG-U) of the NGC 120 may support the GTP-U interface. Also, the communications between the MMEs and the communications between the MME and the GW (e.g., S-GW or P-GW) may be performed based on the GTP-C interface, and the communications between the GWs (e.g., S-GW, P-GW) may be performed based on the GTP-U interface. The communications between NG-Cs and the communications between NG-C and NG-U may be performed based on the STP-C interface, and the communications between NG-Us may be performed based on the STP-U interface.

The gNB 121 may support the 5G communication technology, and the communications between the gNB 121 and the NGC 120 may be performed based on a new generation (NG) interface. The NG interface may be an interface supporting the 5G communication technology, and may include an NG-C interface and an NG-U interface. For example, the communications between the gNB 121 and the NG-C of the NGC 120 may be performed based on the NG-C interface, and the communications between the gNB 121 and the NG-U of the NGC 120 may be performed by the NG-U interface.

The UE 130 may support the 4G communication technology, the 5G communication technology, and the like. Therefore, the UE 130 may communicate with the eNB 111 based on the 4G communication technology, and may communicate with the gNB 121 based on the 5G communication technology. The UE 130 may also perform a handover procedure from the eNB 111 to the gNB 121 and a handover procedure from the gNB 121 to the eNB 111. That is, the handover procedure may be an inter-radio access technology (inter-RAT) handover procedure, and may be controlled by the EPC 110 and the NGC 120.

Figure 2:
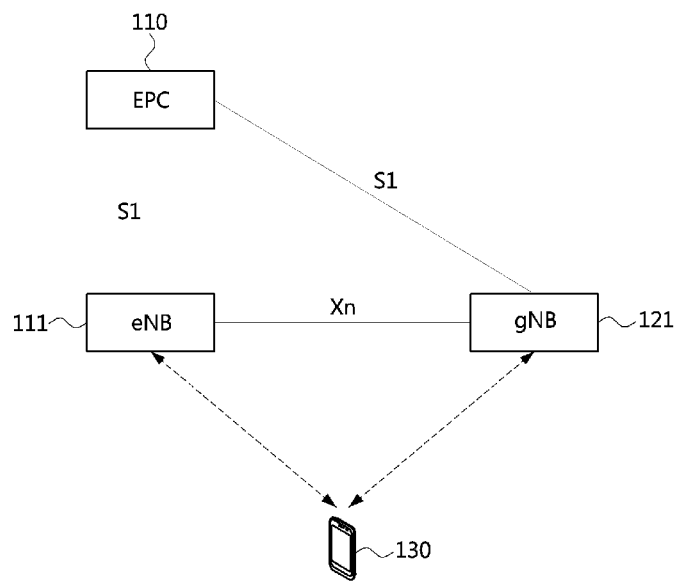
FIG. 2 is a conceptual diagram illustrating a second embodiment of a communication system.

FIG. 2 is a conceptual diagram illustrating a second embodiment of a communication system.

Referring to FIG. 2, a communication system may comprise an EPC 110, an eNB 111, a gNB 121, a UE 130, and the like. Each of the EPC 110, the eNB 111, the gNB 121 and the UE 130 may perform a function identical to or similar as the function of each of the EPC 110, the eNB 111, the gNB 121, and the UE 130 shown in FIG. 1. The communication system shown in FIG. 2 may be referred to as a 'communication system B-1'. The communications between the EPC 110 and the eNB 111 may be performed based on the S1 interface. The gNB 121 may support the 4G communication technology as well as the 5G communication technology, in which case the gNB 121 may be connected to the EPC 110. The communications between the EPC 110 and the gNB 121 may be performed based on the S1 interface. Therefore, the EPC 110 may control both of the eNB 111 and the gNB 121.

The eNB 111 may provide coverage for the communication system B-1 and may operate as a master base station (e.g., an anchor base station). The gNB 121 may provide an enhanced capacity for the communication system B-1 and may operate as a slave base station (e.g., a subsidiary base station). The communications between the eNB 111 and the gNB 121 may be performed based on an Xn interface. The Xn interface may be an interface supporting communications between the eNB 111 and the gNB 121, and may include an Xn-C interface and an Xn-U interface. The UE 130 may communicate with the eNB 111 and the gNB 121. For example, the UE 130 may perform communications in the coverage provided by the eNB 111 and may perform communications based on the enhanced capacity provided by the gNB 121.

Figure 3:
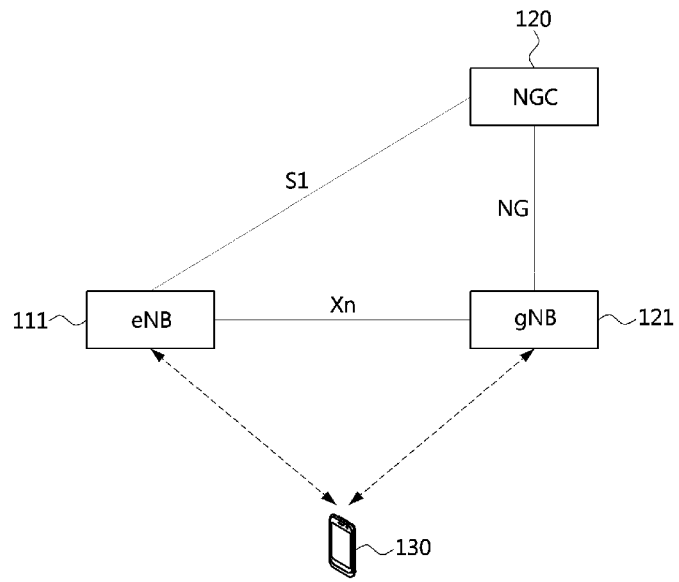
FIG. 3 is a conceptual diagram illustrating a third embodiment of a communication system.

FIG. 3 is a conceptual diagram illustrating a third embodiment of a communication system.

Referring to FIG. 3, a communication system may comprise an eNB 111, an NGC 120, a gNB 121, a UE 130, and the like. Each of the eNB 111, the NGC 120, the gNB 121, and the UE 130 may perform a function identical to or similar as the function of each of the eNB 111, the NGC 120, the gNB 121, and the UE 130 shown in FIG. 1. The communication system shown in FIG. 3 may be referred to as a 'communication system B-2'. The communications between the NGC 120 and the gNB 121 may be performed based on the NG interface. Here, since the NGC 120 supports the 4G communication technology, the eNB 111 may be connected to the NGC 120. The communications between the NGC 120 and the eNB 111 may be performed based on the S1 interface. Therefore, the EPC 110 may control both of the eNB 111 and the gNB 121.

The eNB 111 may provide the coverage for the communication system B-2 and may operate as a master base station (e.g., an anchor base station). The gNB 121 may provide the enhanced capacity for the communication system B-2 and may operate as a slave base station (e.g., a subsidiary base station). The communications between the eNB 111 and the gNB 121 may be performed based on an Xn interface. The Xn interface may be an interface supporting communications between the eNB 111 and the gNB 121, and may include an Xn-C interface and an Xn-U interface. The UE 130 may communicate with the eNB 111 and the gNB 121. For example, the UE 130 may perform communications in the coverage provided by the eNB 111 and may perform communications based on the enhanced capacity provided by the gNB 121.

Figure 4:
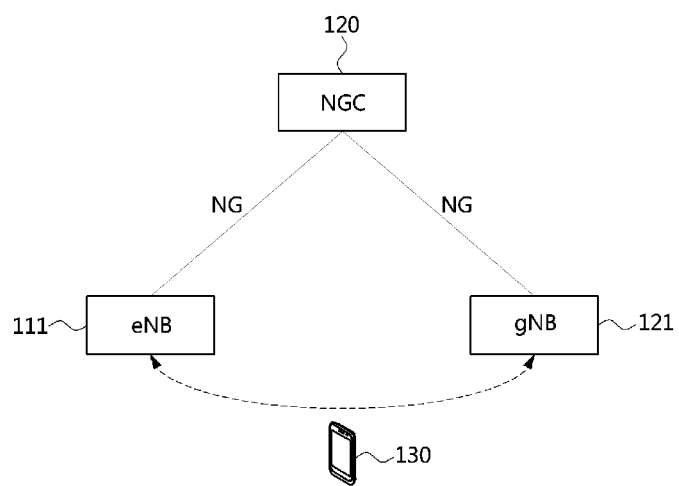
FIG. 4 is a conceptual diagram illustrating a fourth embodiment of a communication system.

FIG. 4 is a conceptual diagram illustrating a fourth embodiment of a communication system.

Referring to FIG. 4, a communication system may comprise an eNB 111, an NGC 120, a gNB 121, a UE 130, and the like. Each of the eNB 111, the NGC 120, the gNB 121 and the UE 130 may perform a function identical to or similar as the function of each of the eNB 111, the NGC 120, the gNB 121, and the UE 130 shown in FIG. 1. The communication system shown in FIG. 4 may be referred to as a 'communication system C-1'. The communications between the NGC 120 and the gNB 121 may be performed based on the NG interface. Here, the eNB 111 may support the 5G communication technology as well as the 4G communication technology, in which case the eNB 111 may be connected to the NGC 120. The communications between the NGC 120 and the eNB 111 may be performed based on the NG interface.

The UE 130 may support the 4G communication technology, the 5G communication technology, and the like. Therefore, the UE 130 may communicate with the eNB 111 based on the 4G communication technology or the 5G communication technology, and may communicate with the gNB 121 based on the 5G communication technology. The UE 130 may also perform a handover procedure from the eNB 111 to the gNB 121 and a handover procedure from the gNB 121 to the eNB 111. That is, the handover procedure may be an inter-RAT handover procedure, and may be controlled by the NGC 120.

Figure 5:
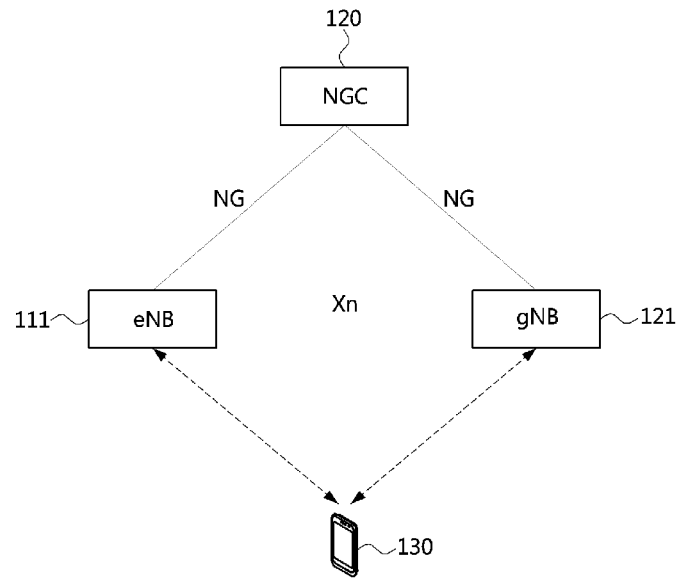
FIG. 5 is a conceptual diagram illustrating a fifth embodiment of a communication system.

FIG. 5 is a conceptual diagram illustrating a fifth embodiment of a communication system.

Referring to FIG. 5, a communication system may comprise an eNB 111, an NGC 120, a gNB 121, a UE 130, and the like. Each of the eNB 111, the NGC 120, the gNB 121, and the UE 130 may perform a function identical to or similar as the function of each of the eNB 111, the NGC 120, the gNB 121, and the UE 130 shown in FIG. 1. The communication system shown in FIG. 5 may be referred to as a 'communication system C-2'. The communications between the NGC 120 and the gNB 121 may be performed based on the NG interface. Here, the eNB 111 may support the 5G communication technology as well as the 4G communication technology, in which case the eNB 111 may be connected to the NGC 120. The communications between the NGC 120 and the eNB 111 may be performed based on the NG interface.

The eNB 111 may provide the coverage for the communication system C-2 and may operate as a master base station (e.g., an anchor base station). The gNB 121 may provide the enhanced capacity for the communication system C-2 and may operate as a slave base station (e.g., a subsidiary base station). The communications between the eNB 111 and the gNB 121 may be performed based on an Xn interface. The Xn interface may be an interface supporting communications between the eNB 111 and the gNB 121, and may include an Xn-C interface and an Xn-U interface. The UE 130 may communicate with the eNB 111 and the gNB 121. For example, the UE 130 may perform communications in the coverage provided by the eNB 111 and may perform communications based on the enhanced capacity provided by the gNB 121.

Figure 6:
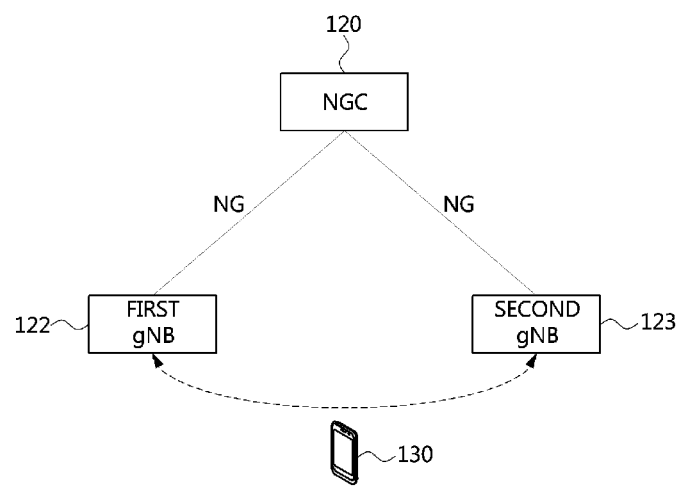
FIG. 6 is a conceptual diagram illustrating a sixth embodiment of a communication system.

FIG. 6 is a conceptual diagram illustrating a sixth embodiment of a communication system.

Referring to FIG. 6, a communication system may comprise an NGC 120, a first gNB 122, a second gNB 123, a UE 130, and the like. Each of the NGC 120 and the UE 130 may perform a function identical to or similar as the function of each of the NGC 120 and the UE 130 shown in FIG. 1. Each of the first gNB 122 and the second gNB 123 may perform a function identical to or similar as the function of the gNB 121 shown in FIG. 1. The communication system shown in FIG. 6 may be referred to as a 'communication system D'.

The communications between the NGC 120 and the first gNB 122 and the communications between the NGC 120 and the second gNB 123 may be performed based on the NG interface. The UE 130 may support the 4G communication technology, the 5G communication technology, and the like, and may communicate with first gNB 122 or the second gNB 123 based on the 5G communication technology. The UE 130 may perform a handover procedure from the first gNB 122 to the second gNB 123 and a handover procedure from the second gNB 123 to the first gNB 122. The handover procedure may be controlled by the NGC 120.

Figure 7:
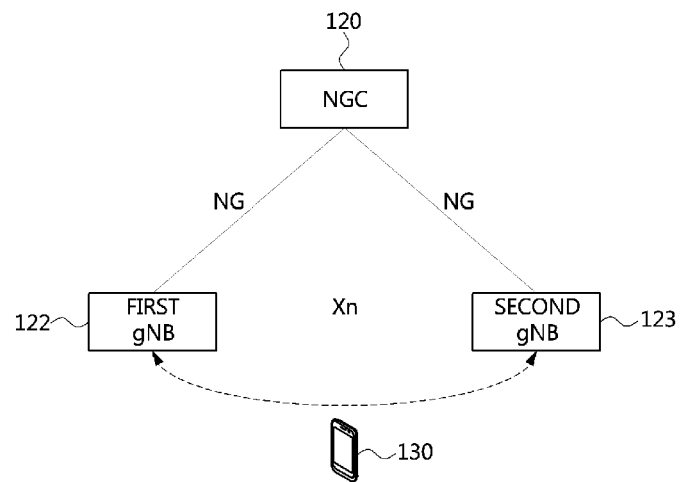
FIG. 7 is a conceptual diagram illustrating a seventh embodiment of a communication system.

FIG. 7 is a conceptual diagram illustrating a seventh embodiment of a communication system.

Referring to FIG. 7, a communication system may comprise an NGC 120, a first gNB 122, a second gNB 123, a UE 130, and the like. Each of the NGC 120 and the UE 130 may perform a function identical to or similar as the function of each of the NGC 120 and the UE 130 shown in FIG. 1. Each of the first gNB 122 and the second gNB 123 may perform a function identical to or similar as the function of the gNB 121 shown in FIG. 1. The communication system shown in FIG. 7 may be referred to as a 'communication system E-1'.

The communications between the NGC 120 and the first gNB 122 and the communications between the NGC 120 and the second gNB 123 may be performed based on the NG interface. The communications between the first gNB 122 and the second gNB 123 may be performed base on the Xn interface. The UE 130 may support the 4G communication technology, the 5G communication technology, and the like, and may communicate with first gNB 122 or the second gNB 123 based on the 5G communication technology. The UE 130 may perform a handover procedure from the first gNB 122 to the second gNB 123 and a handover procedure from the second gNB 123 to the first gNB 122. The handover procedure may be controlled by the NGC 120.

Figure 8:
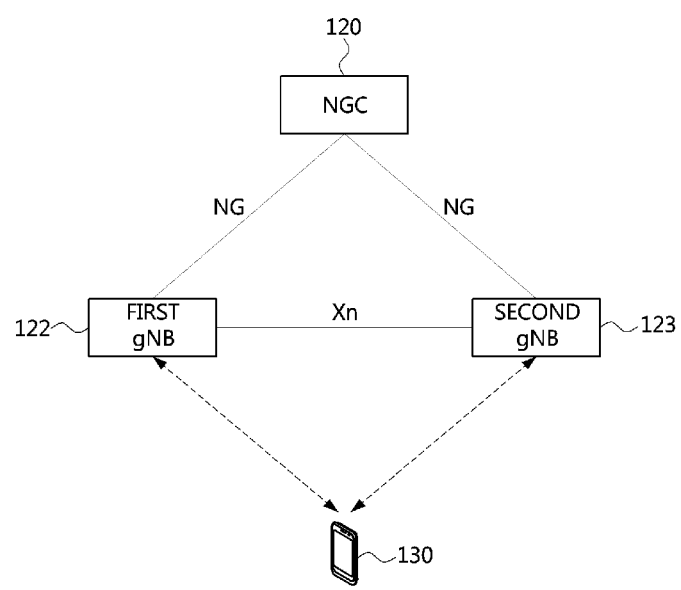
FIG. 8 is a conceptual diagram illustrating an eighth embodiment of a communication system.

FIG. 8 is a conceptual diagram illustrating an eighth embodiment of a communication system.

Referring to FIG. 8, a communication system may comprise an NGC 120, a first gNB 122, a second gNB 123, a UE 130, and the like. Each of the NGC 120 and the UE 130 may perform a function identical to or similar as the function of each of the NGC 120 and the UE 130 shown in FIG. 1. Each of the first gNB 122 and the second gNB 123 may perform a function identical to or similar as the function of the gNB 121 shown in FIG. 1. The communication system shown in FIG. 8 may be referred to as a 'communication system E-2'.

The communications between the NGC 120 and the first gNB 122 and the communications between the NGC 120 and the second gNB 123 may be performed based on the NG interface. The communications between the first gNB 122 and the second gNB 123 may be performed base on the Xn interface. The first gNB 122 may operate as a master base station (e.g., anchor base station) in the communication system E-2. The second gNB 123 may operate as a slave base station (e.g., a subsidiary base station) in the communication system E-2. The UE 130 may communicate with both of the first gNB 122 and the second gNB 123 simultaneously. Accordingly, the capacity of the communication system can be enhanced.

Figure 9:
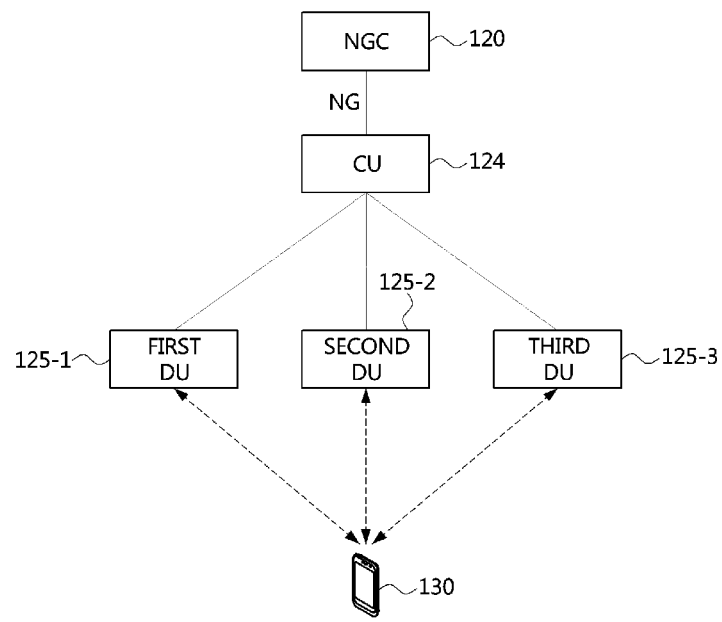
FIG. 9 is a conceptual diagram illustrating a ninth embodiment of a communication system.

FIG. 9 is a conceptual diagram illustrating a ninth embodiment of a communication system.

Referring to FIG. 9, a communication system may comprise an NGC 120, a central unit (CU) 124, a first digital unit (DU) 125-1, a second DU 125-2, a third DU 125-3, a UE 130, and the like. Each of the NGC 120 and the UE 130 may perform a function identical to or similar as the function of each of the NGC 120 and the UE 130 shown in FIG. 1. The communications between the NGC 120 and the CU 124 may be performed based on the NG interface. The communication system shown in FIG. 9 may be referred to as a 'communication system F'.

The CU 124 may perform at least one of the functions of the gNB 121 shown in FIGS. 1 to 8, and each of the DUs 125-1, 125-2, and 125-3 may perform at least one function which is not performed by the CU 124 among the functions of the gNB 121 shown in FIGS. 1 to 8. For example, the CU 124 may perform a packet data convergence protocol (PDCP) function and a radio link control (RLC) function of the gNB 121 shown in FIGS. 1 to 8. In this case, each of the DUs 125-1, 125-2, and 125-3 may perform a medium access control (MAC) function and a physical (PHY) function of the gNB 121 shown in FIGS. 1 to 8. Alternatively, the CU 124 may perform the PDCP function, the RLC function, and the MAC function of the gNB 121 shown in FIGS. 1 to 8, and in this case, each of the DUs 125-1, 125-2, and 125-3 may perform the PHY function of the gNB 121 shown in FIGS. 1 to 8. The UE 130 may communicate with the DUs 125-1, 125-2, and 125-3. Here, the communications between the UE 130 and the DUs 125-1, 125-2 and 125-3 may be performed based on a multi-point transmission/reception scheme (e.g., coordinated multi-point transmission/reception scheme (CoMP)).

Meanwhile, the communication node included in the communication system shown in FIGS. 1 to 9 may be configured as follows.

Figure 10:
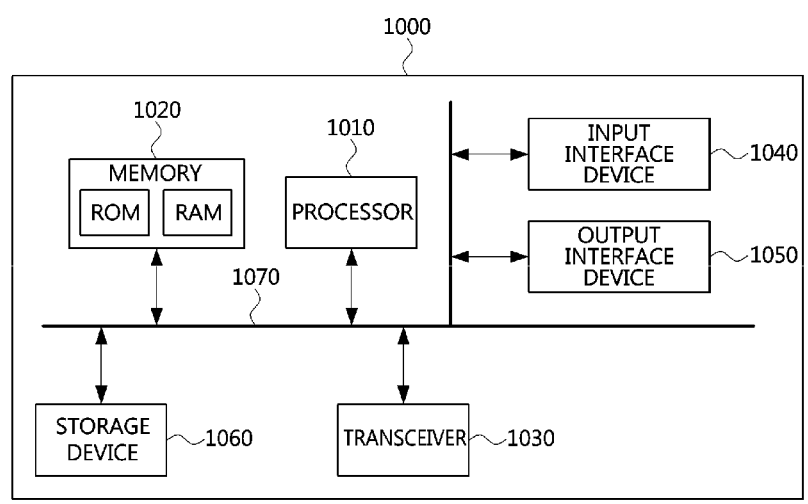
FIG. 10 is a block diagram illustrating a first embodiment of a communication node constituting a communication network.

FIG. 10 is a block diagram illustrating a first embodiment of a communication node constituting a communication network.

Referring to FIG. 10, a communication node 1000 may be the EPC 110 (e.g., MME, S-GW, or P-GW), the eNB 111, the NGC 120 (e.g., NG-C or NG-U), the gNB 121, 122, or 123, the CU 124, the DU 125-1, 125-2, or 125-3, the UE 130, or the like. The communication node 1000 may comprise at least one processor 1010, a memory 1020, and a transceiver 1030 connected to the network for performing communications. Also, the communication node 1000 may further comprise an input interface device 1040, an output interface device 1050, a storage device 1060, and the like. Each component included in the communication node 1000 may communicate with each other as connected through a bus 1070. However, each of the components included in the communication node 1000 may be connected to the processor 1010 via a separate interface or a separate bus rather than the common bus 1070. For example, the processor 110 may be connected to at least one of the memory 1020, the transceiver 1030, the input interface device 1040, the output interface device 1050, and the storage device 1060 via a dedicated interface.

The processor 1010 may execute a program stored in at least one of the memory 1020 and the storage device 1060. The processor 1010 may refer to a central processing unit (CPU), a graphics processing unit (GPU), or a dedicated processor on which methods in accordance with embodiments of the present disclosure are performed. Each of the memory 1020 and the storage device 1060 may be constituted by at least one of a volatile storage medium and a non-volatile storage medium. For example, the memory 1020 may comprise at least one of read-only memory (ROM) and random access memory (RAM).

In the communication systems shown in FIGS. 1 to 9, an evolved packet system (EPS) bearer may be configured as follows.

Figure 11:
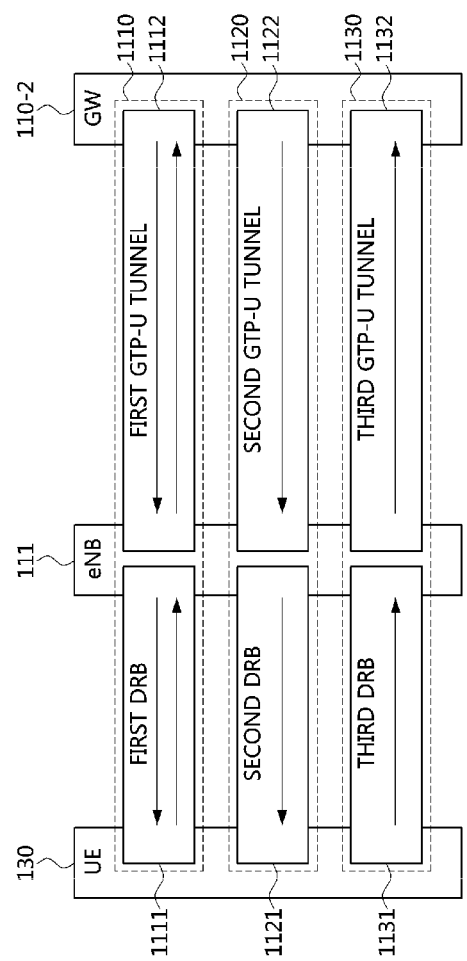
FIG. 11 is a conceptual diagram illustrating EPS bearers in a communication system.

FIG. 11 is a conceptual diagram illustrating EPS bearers in a communication system.

Referring to FIG. 11, a communication system may comprise an EPC 110, an eNB 111, a UE 130, and the like. The EPC 110 may include an MME and a GW 110-2. Each of the EPC 110, the eNB 111, and the UE 130 may be the same as or similar to each of the EPC 110, the eNB 111, and the UE 130 shown in FIGS. 1 and 2. At least one EPS bearer 1110, 1120, and 1130 may be established in a communication path of (UE 130-eNB 111-GW 110-2) (e.g., the communication path for the user plane). Each of the EPS bearers 1110, 1120, and 1130 may be a default EPS bearer or a dedicated EPS bearer.

Quality of Service (QoS) parameters for the EPS bearers 1110, 1120, and 1130 may be configured. The QoS parameters may include QoS class identifier (QCI), allocation and retention priority (ARP), guaranteed bit rate (GBR), maximum bit rate (MBR), and the like. The QoS parameters may be configured differently for the EPS bearers 1110, 1120, and 1130. For example, in case that the QCI is set to a value from 1 to 9, the QCI of the first EPS bearer 1110 may be set to 1, the QCI of the second EPS bearer 1120 may be set to 5, and the QCI of the third EPS bearer 1130 may be set to 9. According to the QCI, priority, packet delay budget (PDB), packet error rate (PELS), and the like may be configured differently.

The first EPS bearer 1110 may include a first data radio bearer (DRB) 1111 established between the UE 130 and the eNB 111 and a first GTP-U tunnel 1112 established between the eNB 111 and the GW 110-2. The first DRB 1111 may be mapped to the first GTP-U tunnel 1112. Each of the first DRB 1111 and the first GTP-U tunnel 1112 may be used for downlink (DL) transmission and uplink (UL) transmission. A DL tunnel identifier (TEID) used for the DL transmission may be configured, and a UL TEID used for the UL transmission may be configured in the first GTP-U tunnel 1112.

The second EPS bearer 1120 may include a second DRB 1121 established between the UE 130 and the eNB 111 and a second GTP-U tunnel 1122 established between the eNB 111 and the GW 110-2. The second DRB 1121 may be mapped to the second GTP-U tunnel 1122. Each of the second DRB 1121 and the second GTP-U tunnel 1122 may be used for DL transmission. A DL TEID used for the DL transmission may be configured in the second GTP-U tunnel 1122. The third EPS bearer 1130 may include a third DRB 1131 established between the UE 130 and the eNB 111 and a third GTP-U tunnel 1132 established between the eNB 111 and the GW 110-2. The third DRB 1131 may be mapped to the third GTP-U tunnel 1132. Each of the third DRB 1131 and the third GTP-U tunnel 1132 may be used for UL transmission. A UL TEID used for the UL transmission may be configured in the third GTP-U tunnel 1132.

In the communication systems shown in FIGS. 1 to 9, a new radio (NR) bearer may be configured as follows.

Figure 12:
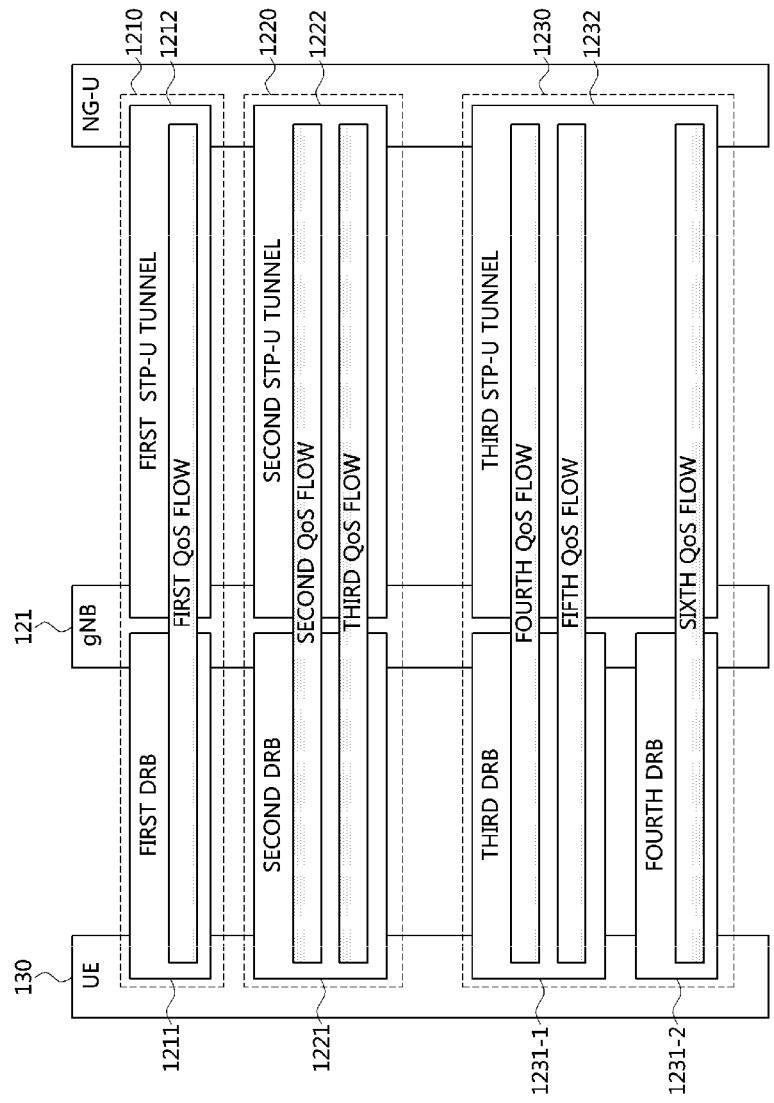
FIG. 12 is a conceptual diagram illustrating NR bearers in a communication system.

FIG. 12 is a conceptual diagram illustrating NR bearers in a communication system.

Referring to FIG. 12, a communication system may comprise an NGC 120, a gNB 121, a UE 130, and the like. The NGC 120 may include an NG-C and an NG-U. Each of the NGC 120, the gNB 121, and the UE 130 may be the same as or similar to each of the NGC 120, the gNBs 121, 122, and 123, and the UE 130 shown in FIGS. 1 and 3 to 8. At least one NR bearer 1210, 1220, and 1230 may be established in a communication path of (UE 130-gNB 121-NG-U) (e.g., the communication path for the user plane). Each of the NR bearers 1210, 1220 and 1230 may be a default NR bearer or a dedicated NR bearer.

The first NR bearer 1210 may include a first DRB 1211 established between the UE 130 and the gNB 121 and a first STP-U tunnel 1212 established between the gNB 121 and the NG-U. The first DRB 1211 may be mapped to the first STP-U tunnel 1212. At least one QoS flow (e.g., a first QoS flow) may be configured in (first DRB 1211-first STP-U tunnel 1212). The second NR bearer 1220 may include a second DRB 1221 established between the UE 130 and the gNB 121 and a second STP-U tunnel 1222 established between the gNB 121 and the NG-U. The second DRB 1221 may be mapped to the second STP-U tunnel 1222. At least one QoS flow (e.g., a second QoS flow and a third QoS flow) may be configured in (second DRB 1221-second STP-U tunnel 1222).

The third NR bearer 1230 may include a third DRB 1231-1 and a fourth DRB 1231-2 established between the UE 130 and the gNB 121 and a third STP-U tunnel 1232 established between the gNB 121 and the NG-U. The third DRB 1231-1 and the fourth DRB 1231-2 may be mapped to the third STP-U tunnel 1232. That is, a plurality of DRBs may be mapped to a single STP-U tunnel. At least one QoS flow (e.g., a fourth QoS flow and a fifth QoS flow) may be configured in (third DRB 1231-1-third STP-U tunnel 1232), and at least one QoS flow (e.g., a sixth QoS flow) may be configured in (fourth DRB 1231-2-third STP-U tunnel 1232).

Here, QoS parameters for the QoS flows may be configured. The QoS parameters may include QCI, ARP, GBR, MBR, and the like. The QoS parameters for the QoS flows may be configured differently.

Meanwhile, a data unit transmitted and received via the NG interface (e.g., the NG-C interface and the NG-U interface) may be configured as follows.

Figure 13:
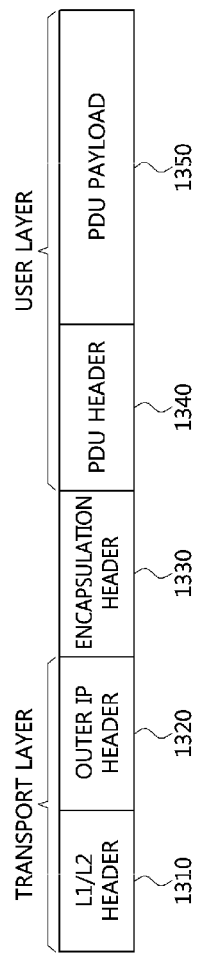
FIG. 13 is a block diagram illustrating a first embodiment of a data unit transmitted and received via an NG interface.

FIG. 13 is a block diagram illustrating a first embodiment of a data unit transmitted and received via an NG interface.

Referring to FIG. 13, a data unit may include an L1/L2 header 1310, an outer IP header 1320, an encapsulation header 1330, a protocol data unit (PDU) header 1340, and a PDU payload 1350. The outer IP header 1320 may include an IP 5-tuple. The IP 5-tuple may be configured differently for each PDU session and may be used in common for all QoS classes in one PDU session. The encapsulation header 1330 may indicate a QoS, a PDU session, and the like. Therefore, the PDU session, the QoS requirement, and the like may be identified based on the encapsulation header 1330, so that a communication node (e.g., a switch, a router, etc.) may support QoS of the corresponding data unit. Here, the QoS may be provisioned to the communication node.

Hereinafter, operation methods for the communication systems shown in FIGS. 1 to 9 will be described. The operation methods of the communication systems described below may use the EPS bearer described in FIG. 11, the NR bearer described in FIG. 12, the data unit described in FIG. 13, and the like. Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Operation of Communication System A

In the communication system A, the handover procedure from the eNB 111 to the gNB 121 may be performed as follows. The eNB 111 may be a serving base station (or a source base station) of the UE 130 and the gNB 121 may be a target base station of the UE 130.

Figure 14:
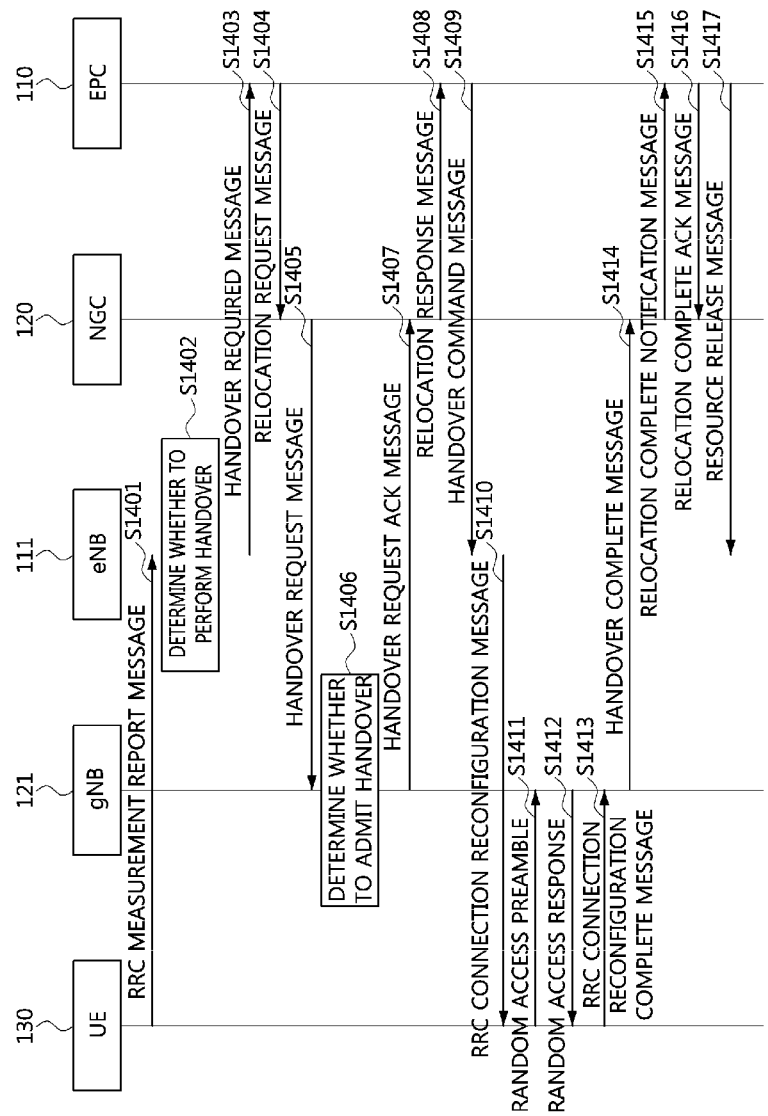
FIG. 14 is a sequence chart illustrating a first embodiment of a handover procedure in the communication system A.

FIG. 14 is a sequence chart illustrating a first embodiment of a handover procedure in the communication system A.

Referring to FIG. 14, the communication system A may comprise the EPC 110, the eNB 111, the NGC 120, the gNB 121, the UE 130, and the like. The EPC 110, the eNB 111, the NGC 120, the gNB 121, and the UE 130 may be identical to or similar to the EPC 110, the eNB 111, the NGC 120, the gNB 121, and the UE 130 shown in FIG. 1. Each of the EPC 110, the eNB 111, the NGC 120, the gNB 121, and the UE 130 may be configured to be the same as or similar to the communication node 1000 shown in FIG. 10. Here, the operation of the EPC 110 may be performed by a communication node (e.g., MME, S-GW, etc.) included in the EPC 110 and the operation of the NGC 120 may be performed by a communication node (e.g., NG-C, NG-U, etc.) included in the NGC 120. The RRC message used in the below RRC signaling procedure may be the same as or similar to the RRC message defined in the 3rd generation partnership project (3GPP).

The UE 130 may be connected to the eNB 111 and may receive channel measurement information from the eNB 111. The channel measurement information may include an object to be measured, a measurement scheme, and the like. The UE 130 may measure signals (e.g., reference signals) received from the eNB 111, the gNB 121, etc. and identify a channel condition based on the measurement on the signals. The UE 130 may generate a radio resource control (RRC) measurement report message including channel state information (e.g., received signal strength) and transmit the RRC measurement report message to the eNB 111 (S1401).

The eNB 111 may receive the RRC measurement report message from the UE 130 and may determine whether to perform a handover based on the channel state information included in the RRC measurement report message (S1402). For example, when the received signal strength of the gNB 121 is greater than the received signal strength of the eNB 111 or when the received signal strength of the gNB 121 is greater than (the received signal strength of the eNB 111+a predetermined margin), the eNB 111 may determine to perform a handover from the eNB 111 to the gNB 121. In this case, the eNB 111 may generate a handover required message. The handover required message may include an identifier of the gNB 121 (i.e., an identifier of the target base station), a source-to-target transparent container (e.g., connection information of the UE 130 in the eNB 111 (i.e., the source base station)), and the like. The eNB 111 may transmit the handover required message to the EPC 110 (e.g., the MME included in the EPC 110) via the S1-C interface (S1403).

The EPC 110 may receive the handover required message from the eNB 111 and identify the NGC 120 to which the gNB 121 is connected based on the information included in the handover required message. The EPC 110 may transmit a relocation request message to the NGC 120 using the STP-C interface or the GTP-C interface (S1404). The relocation request message may include the identifier of the gNB 121, the source-to-target transparent container, and the like.

The NGC 120 may receive the relocation request message from the EPC 110 and confirm that the target base station is the gNB 121 based on the information included in the relocation request message. The NGC 120 may generate a handover request message based on the relocation request message and may transmit the handover request message to the gNB 121 using the NG-C interface (S1405). The handover request message may include the source-to-targeted transparent container or the like. The gNB 121 may receive the handover request message from the NGC 120 and may determine whether to admit the handover procedure based on the handover request message (S1406). If the handover procedure from the eNB 111 to the gNB 121 is admitted, the gNB 121 may prepare the handover procedure using the source-to-target transparent container included in the handover request message, and generate a handover request acknowledgment (ACK) message. The gNB 121 may transmit the handover request ACK message to the NGC 120 using the NG-C interface (S1407). The handover request ACK message may include a target-to-source transparent container, and the target-to-source transparent container may include RRC connection reconfiguration information for the handover procedure of the gNB 121, and the like.

The NGC 120 may receive the handover request ACK message from the gNB 121 and may generate a relocation response message including the target-to-source transparent container or the like based on the handover request ACK message. The relocation response message may request initiation of the handover procedure from the eNB 111 to the gNB 121. The NGC 120 may transmit the relocation response message to the EPC 110 using the STP-C interface or the GTP-C interface (S1408). The EPC 110 may receive the relocation response message from the NGC 120 and may generate a handover command message including the target-to-source transparent container or the like based on the received relocation response message. The EPC 110 may transmit the handover command message to the eNB 111 using the S1-C interface (S1409).

The eNB 111 may receive the handover command message from the EPC 110 and may generate an RRC connection reconfiguration message based on the target-to-source transparent container included in the handover command message. The eNB 111 may transmit the RRC connection reconfiguration message to the UE 130 (S1410). The UE 130 may receive the RRC connection reconfiguration message from the eNB 111 and may perform the handover procedure from the eNB 111 to the gNB 121 based on the received RRC connection reconfiguration message.

The UE 130 may transmit a random access preamble to the gNB 121 through a physical random access channel (PRACH) (S1411). The gNB 121 may receive the random access preamble from the UE 130 and may transmit a random access response to the UE 130 in response to the random access preamble (S1412). When the random access response is received from the gNB 121, the UE 130 may transmit an RRC connection reconfiguration complete message to the gNB 121 (S1413).

Upon receiving the RRC connection reconfiguration complete message from the UE 130, the gNB 121 may generate a handover complete message indicating that the handover procedure is completed. The gNB 121 may transmit the handover complete message to the NGC 120 using the NG-C interface (S1414). Upon receiving the handover complete message from the gNB 121, the NGC 120 may determine that the handover procedure from the eNB 111 to the gNB 121 is completed. In this case, the NGC 120 may generate a relocation complete notification message and may transmit the relocation complete notification message to the EPC 110 using the STP-C interface or the GTP-C interface (S1415). The relocation complete notification message may indicate that the handover procedure (e. g., relocation procedure) from the eNB 111 to the gNB 121 is complete.

The EPC 110 may receive the relocation complete notification message from the NGC 120 and determine that the handover procedure from the eNB 111 to the gNB 121 is completed based on the received relocation complete notification message. In this case, the EPC 110 may generate a relocation complete ACK message and transmit the relocation complete ACK message to the NGC 120 using the STP-C interface or the GTP-C interface (S1416). Upon receiving the relocation complete ACK message from the EPC 110, the NGC 120 may terminate the handover procedure.

Also, the EPC 110 may generate a resource release message instructing to release resources allocated to the UE 130 and transmit the resource release message to the eNB 111 using the S1-C interface (S1417). The eNB 111 may receive the resource release message from the EPC 110 and release the resources allocated to the UE 130 based on the received resource release message.

Meanwhile, in the communication system A, the handover procedure from the gNB 121 to the eNB 111 may be performed as follows. The gNB 121 may be a serving base station (or a source base station) of the UE 130 and the eNB 111 may be a target base station of the UE 130.

Figure 15:
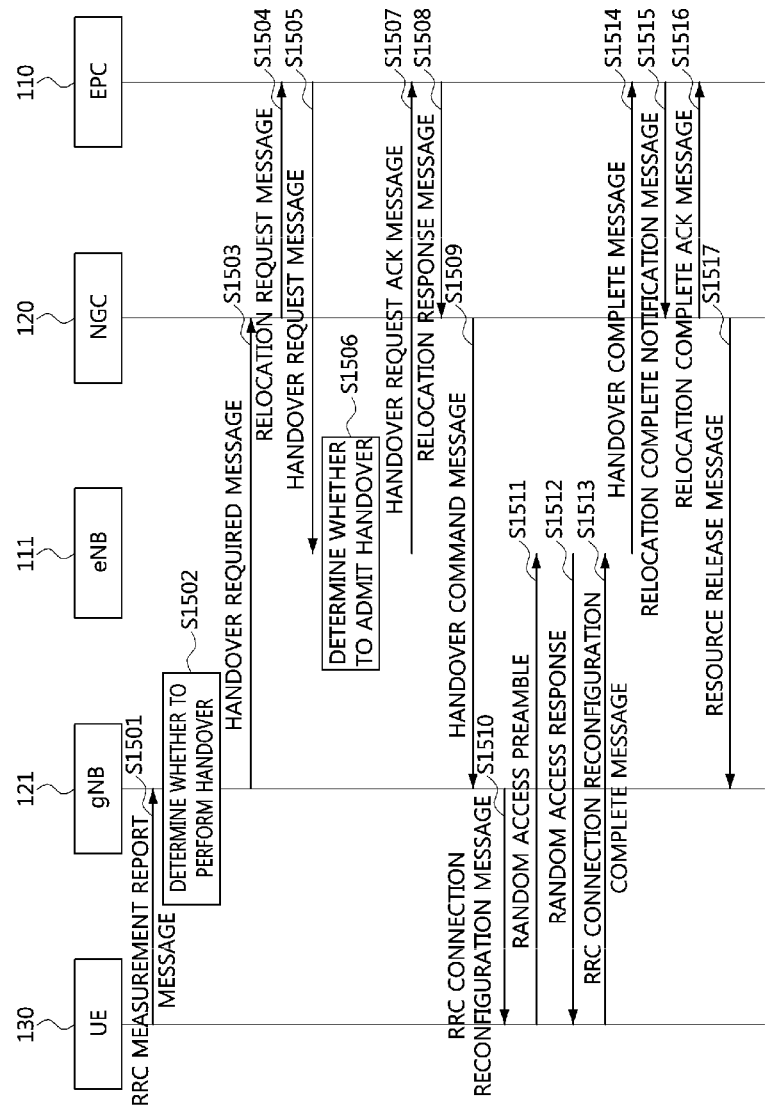
FIG. 15 is a sequence chart illustrating a second embodiment of a handover procedure in the communication system A.

FIG. 15 is a sequence chart illustrating a second embodiment of a handover procedure in the communication system A.

Referring to FIG. 15, the communication system A may comprise the EPC 110, the eNB 111, the NGC 120, the gNB 121, the UE 130, and the like. The EPC 110, the eNB 111, the NGC 120, the gNB 121, and the UE 130 may be identical to or similar to the EPC 110, the eNB 111, the NGC 120, the gNB 121, and the UE 130 shown in FIG. 1. Each of the EPC 110, the eNB 111, the NGC 120, the gNB 121, and the UE 130 may be configured to be the same as or similar to the communication node 1000 shown in FIG. 10. Here, the operation of the EPC 110 may be performed by a communication node (e.g., MME, S-GW, etc.) included in the EPC 110 and the operation of the NGC 120 may be performed by a communication node (e.g., NG-C, NG-U, etc.) included in the NGC 120. The RRC message used in the RRC signaling procedure may be the same as or similar to the RRC message defined in the 3rd generation partnership project (3GPP).

The UE 130 may be connected to the gNB 121 and may receive channel measurement information from the gNB 121. The channel measurement information may include an object to be measured, a measurement scheme, and the like. The UE 130 may measure signals (e.g., reference signals)

received from the eNB 111, the gNB 121, etc. and identify a channel condition based on the measurement on the signals. The UE 130 may generate an RRC measurement report message including channel state information (e.g., received signal strength) and transmit the RRC measurement report message to the gNB 121 (S1501).

The gNB 121 may receive the RRC measurement report message from the UE 130 and may determine whether to perform a handover based on the channel state information included in the RRC measurement report message (S1502). For example, when the received signal strength of the eNB 111 is greater than the received signal strength of the gNB 121 or when the received signal strength of the eNB 111 is greater than (the received signal strength of the gNB 121+a predetermined margin), the gNB 121 may determine to perform a handover from the gNB 121 to the eNB 111. In this case, the gNB 121 may generate a handover required message. The handover required message may include an identifier of the eNB 111 (i.e., an identifier of the target base station), a source-to-target transparent container (e.g., connection information of the UE 130 in the gNB 121 (i.e., the source base station)), and the like. The gNB 121 may transmit the handover required message to the NGC 120 via the NG-C interface (S1503).

The NGC 120 may receive the handover required message from the gNB 121 and identify the EPC 110 to which the eNB 111 is connected based on the information included in the handover request message. The NGC 120 may transmit a relocation request message to the EPC 110 using the STP-C interface or the GTP-C interface (S1504). The relocation request message may include the identifier of the eNB 111, the source-to-target transparent container, and the like.

The EPC 110 may receive the relocation request message from the NGC 120 and confirm that the target base station is the eNB 111 based on the information included in the relocation request message. The EPC 110 may generate a handover request message based on the relocation request message and may transmit the handover request message to the eNB 111 using the S1-C interface (S1505). The handover request message may include the source-to-targeted transparent container or the like. The eNB 111 may receive the handover request message from the EPC 110 and may determine whether to admit the handover procedure based on the handover request message (S1506). If the handover procedure from the gNB 121 to the eNB 111 is admitted, the eNB 111 may prepare the handover procedure using the source-to-target transparent container included in the handover request message, and generate a handover request ACK message. The eNB 111 may transmit the handover request ACK message to the EPC 110 using the S1-C interface (S1507). The handover request ACK message may include a target-to-source transparent container, and the target-to-source transparent container may include RRC connection reconfiguration information for the handover procedure, and the like.

The EPC 110 may receive the handover request ACK message from the eNB 111 and may generate a relocation response message including the target-to-source transparent container or the like based on the handover request ACK message. The relocation response message may request initiation of the handover procedure from the gNB 121 to the eNB 111. The EPC 110 may transmit the relocation response message to the NGC 120 using the STP-C interface or the GTP-C interface (S1508). The NGC 120 may receive the relocation response message from the EPC 110 and may generate a handover command message including the target-to-source transparent container or the like based on the received relocation response message. The NGC 120 may transmit the handover command message to the gNB 121 using the NG-C interface (S1509).

The gNB 121 may receive the handover command message from the NGC 120 and may generate an RRC connection reconfiguration message based on the target-to-source transparent container included in the handover command message. The gNB 121 may transmit the RRC connection reconfiguration message to the UE 130 (S1510). The UE 130 may receive the RRC connection reconfiguration message from the gNB 121 and may perform the handover procedure from the gNB 121 to the eNB 111 based on the received RRC connection reconfiguration message.

The UE 130 may transmit a random access preamble to the eNB 111 through a PRACH (S1511). The eNB 111 may receive the random access preamble from the UE 130 and may transmit a random access response to the UE 130 in response to the random access preamble (S1512). When the random access response is received from the eNB 111, the UE 130 may transmit an RRC connection reconfiguration complete message to the eNB 111 (S1513).

Upon receiving the RRC connection reconfiguration complete message from the UE 130, the eNB 111 may generate a handover complete message indicating that the handover procedure is completed. The eNB 111 may transmit the handover complete message to the EPC 110 using the S1-C interface (S1514). Upon receiving the handover complete message from the eNB 111, the EPC 110 may determine that the handover procedure from the gNB 121 to the eNB 111 is completed. In this case, the EPC 110 may generate a relocation complete notification message and may transmit the relocation complete notification message to the NGC 120 using the STP-C interface or the GTP-C interface (S1515). The relocation complete notification message may indicate that the handover procedure (e. g., relocation procedure) from the gNB 121 to the eNB 111 is complete.

The NGC 120 may receive the relocation complete notification message from the EPC 110 and may determine that the handover procedure from the gNB 121 to the eNB 111 is completed based on the received relocation complete notification message. In this case, the NGC 120 may generate a relocation complete ACK message and may transmit the relocation complete ACK message to the EPC 110 using the STP-C interface or the GTP-C interface (S1516). Upon receiving the relocation complete ACK message from the NGC 120, the EPC 110 may terminate the handover procedure.

Also, the NGC 120 may generate a resource release message instructing to release resources allocated to the UE 130 and transmit the resource release message to the gNB 121 using the NG-C interface (S1517). The gNB 121 may receive the resource release message from the NGC 120 and release the resources allocated to the UE 130 based on the received resource release message.

Operation of Communication System B-1

In the communication system B-1, the cooperative communications between the eNB 111 and the gNB 121 may be performed based on the Xn-C interface. The RRC message of the gNB 121 may be transmitted to the UE 130 through a physical channel of the gNB 121 operating independently of the eNB 111. Alternatively, the RRC message of the gNB 121 may be transmitted to the eNB 111 via the Xn-C interface. In this case, the RRC message of the gNB 121 may be transmitted to the UE 130 through a physical channel of the eNB 111. In case that there is a radio interface between the UE 130 and the eNB 111 which is an anchor base station in the communication system B-1, the RRC message of the gNB 121 may be transmitted through the Xn-C interface and the physical channel of the eNB 111 (i.e., the radio interface between the eNB 111 and the UE 130). In the case that the RRC message of the gNB 121 is transmitted through the Xn-C interface and the physical channel of the eNB 111, the gNB 121 may perform an initial access procedure and a mobility procedure (e.g., handover procedure) for the UE 130 without a random access procedure performed by the UE 130. Therefore, when there is a problem in the radio connection between the eNB 111 and the UE 130 or when the mobility procedure between the eNB 111 and the UE 130 is performed, there may be a problem in the communication between the gNB 121 and the UE 130.

Meanwhile, a protocol structure of the communication node belonging to the communication system B-1 may be as follows.

Figure 16:
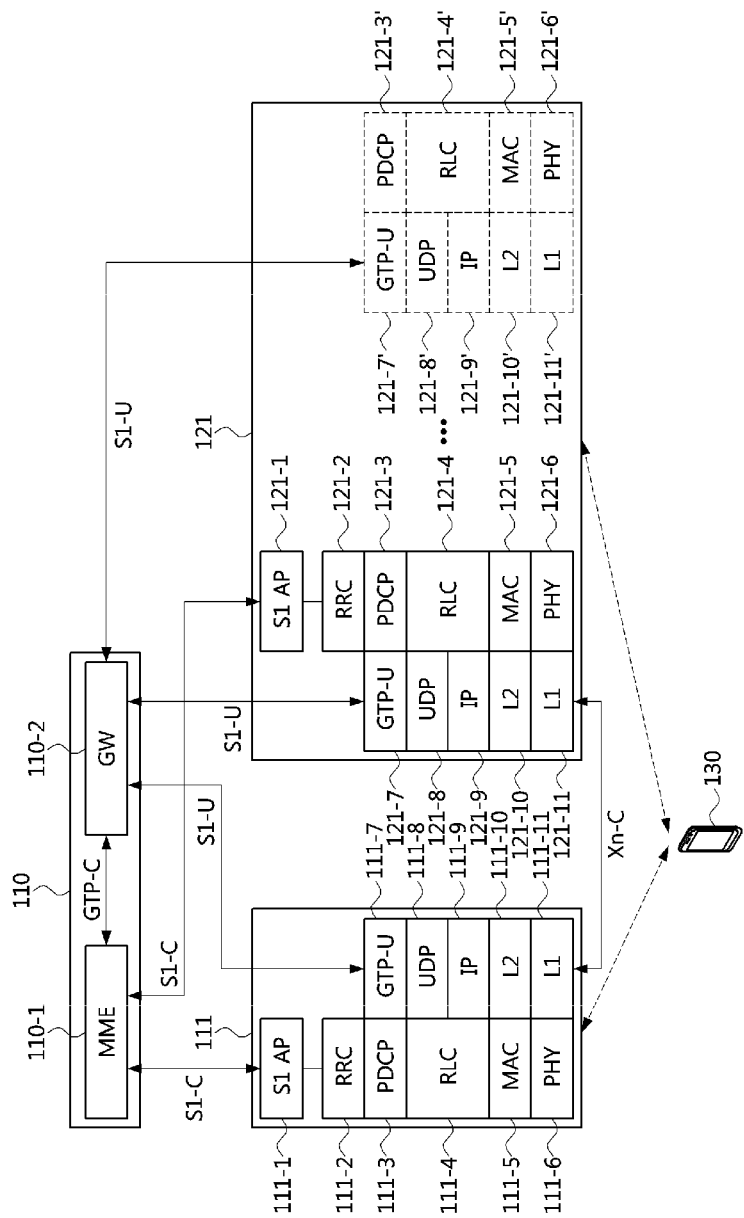
FIG. 16 is a block diagram illustrating a protocol structure of a communication node belonging to the communication system B-1.

FIG. 16 is a block diagram illustrating a protocol structure of a communication node belonging to the communication system B-1.

Referring to FIG. 16, the communication system B-1 may comprise an EPC 110, an eNB 111, a gNB 121, a UE 130, and the like. Each of the EPC 110, the eNB 111, the gNB 121 and the UE 130 may be identical or similar to each of the EPC 110, the eNB 111, the gNB 121 and the UE 130 shown in FIG. 2. Also, each of the EPC 110, the eNB 111, the gNB 121 and the UE 130 may be configured to be the same as or similar to the communication node 1000 shown in FIG. 10.

The EPC 110 may include an MME 110-1 and a GW 110-2. The GW 110-2 may include S-GW and P-GW. The communications between the MME 110-1 and the GW 110-2 may be performed based on the GTP interface (e.g., the GTP-C interface). The eNB 111 may comprise an S1 application protocol (S1-AP) layer 111-1, an RRC layer 111-2, a PDCP layer 111-3, an RLC layer 111-4, a MAC layer 111-5, a PHY layer 111-6, a GTP-U layer 111-7, a user datagram protocol (UDP) layer 111-8, an interne protocol (IP) layer 111-9, an layer-2 (L2) layer 111-10, an layer-1 (L1) layer 111-11, and the like.

The gNB 121 may comprise an S1-AP layer 121-1, an RRC layer 121-2, a first PDCP layer 121-3, a first RLC layer 121-4, a first MAC layer 121-5, a first PHY layer 121-6, a first GTP-U layer 121-7, a first UDP layer 121-8, a first IP layer 121-9, a first L2 layer 121-10, and a first L1 layer 121-11. When the gNB 121 uses a plurality of component carriers (CCs), the first PDCP layer 121-3, the first RLC layer 121-4, the first MAC layer 121-5, the first PHY layer 121-6, the first GTP-U layer 121-7, the first UDP layer 121-8, the first IP layer 121-9, the first L2 layer 121-10, and the first L1 layer 121-11 may be used for supporting a first CC. Also, in order to support an n-th CC, the gNB 121 may further comprise an n-th PDCP layer 121-3', an n-th RLC layer 121-4', an n-th MAC layer 121-5', an n-th PHY layer 121-6', an n-th GTP-U layer 121-7', an n-th UDP layer 121-8', an n-th IP layer 121-9', an n-th L2 layer 121-10', and an n-th L1 layer 121-11'. The RRC layer 121-2, the PDCP layer 121-3, the RLC layer 121-4, the MAC layer 121-5, and the PHY layer 121-6 which are included in the gNB 121 may support the 5G communication technology.

The communications between the MME 110-1 of the EPC 110 and the eNB 111 may be performed based on the S1-C interface. The communications between the GW 110-2 of the EPC 110 and the eNB 111 may be performed based on the S1-U interface. The communications between the MME 110-1 of the EPC 110 and the gNB 121 may be performed based on the S1-C interface. The communications between the GW 110-2 of the EPC 110 and the gNB 121 may be performed based on the S1-U interface.

The communications between the eNB 111 and the gNB 121 may be performed based on the Xn interface (e.g., the Xn-C interface). In this case, the RRC message of the gNB 121 may be transmitted through the Xn-C interface between the gNB 121 and the eNB 111 and the radio interface between the eNB 111 and the UE 130, instead of the radio interface between the gNB 121 and the UE 130. For example, the RRC message of the gNB 121 may be transmitted through the DRB between the eNB 111 and the UE 130. When the RRC message of the gNB 121 is transmitted through the DRB between the eNB 111 and the UE 130, a transmission delay of the RRC message may occur. However, since the transmission of the RRC message is performed based on an RLC acknowledged mode (AM), a hybrid automatic repeat request (HARQ) protocol, or the like, the reliability of the RRC message transmission can be enhanced.

Here, when a communication procedure for the communication path of (UE 130-eNB 111-EPC 110) and a communication procedure for the communication path of (UE 130-gNB 121-EPC 110) occur simultaneously, the RRC message of the gNB 121 may not be transmitted due to the communication procedure for the communication path of (UE 130-eNB 111-EPC 110), so that there may occur a problem in the communication procedure for the communication path of (UE 130-gNB 121-EPC 110). Therefore, it may be desirable to proceed with the communication procedure for the communication path of (UE 130-gNB 121-EPC 110) after the communication procedure for the communication path of (UE 130-gNB 111-EPC 110) is completed or stopped.

Meanwhile, from the user plane viewpoint, the communication system B-1 may be operated as follows.

Figure 17:
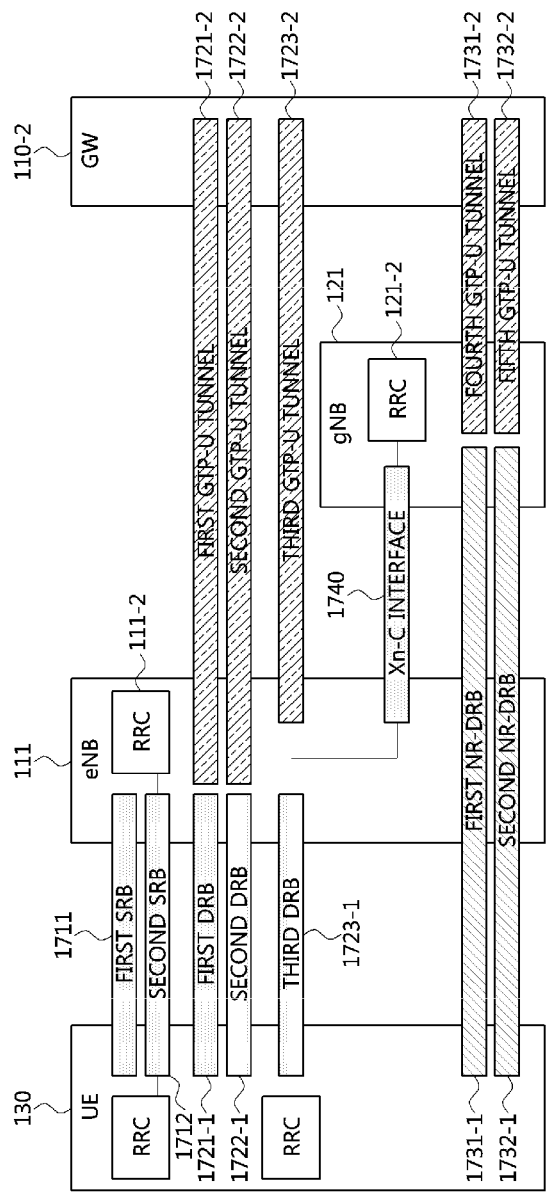
FIG. 17 is a conceptual diagram illustrating EPS bearers in the communication system B-1

FIG. 17 is a conceptual diagram illustrating EPS bearers in the communication system B-1.

Referring to FIG. 17, the communication system B-1 may comprise a GW 110-2, an eNB 111, a gNB 121, a UE 130, and the like. Each of the GW 110-2, the eNB 111, the gNB 121, and the UE 130 may be identical or similar to each of the GW 110-2, the eNB 111, the gNB 121, and the UE 130 shown in FIG. 16.

When the UE 130 is connected to the eNB 111, the RRC message of the eNB 111 may be transmitted and received via signaling radio bearers (SRBs) 1711 and 1712 established between the UE 130 and the eNB 111. The communication procedure for the communication path of (UE 130-eNB 111-GW 110-2) may be performed using (first DRB 1721-1-first GTP-U tunnel 1721-2) and (second DRB 1722-1-second GTP-U tunnel 1722-2). The first DRB 1721-1 may be established between the UE 130 and the eNB 111, and the first GTP-U tunnel 1721-2 corresponding to the first DRB 1721-1 may be established between the eNB 111 and the GW 110-2. The second DRB 1722-1 may be established between the UE 130 and the eNB 111, and the second GTP-U tunnel 1722-2 corresponding to the second DRB 1722-1 may be established between the eNB 111 and the GW 110-2.

A third DRB 1723-1 may be established between the UE 130 and the eNB 111, and the third DRB 1723-1 may be used for transmission and reception of the RRC message of the gNB 121. In this case, a third GTP-U tunnel 1723-2 corresponding to the third DRB 1723-1 may or may not be established between the eNB 111 and the GW 110-2. Even when the third GTP-U tunnel 1723-2 is established, (third DRB 1723-1-third GTP-U tunnel 1723-2) may not be used for the communication procedure for the communication path of (UE 130-eNB 111-GW 110-2). The third DRB 1723-1 may be mapped to the Xn-C interface 1740 between the eNB 111 and the gNB 121, and (third DRB 1723-1-Xn-C interface 1740) may be used for transmission and reception of the RRC message of the gNB 121. That is, the eNB 111 may relay the RRC message of the gNB 121. Since the RRC message of the gNB 121 is transmitted and received through (third DRB 1723-1-Xn-C interface 1740), the gNB 121 may perform an initial access procedure, a mobility support procedure, and the like for the UE 130 without a random access procedure performed by the UE 130.

An SRB (not shown) may be established between the gNB 121 and the UE 130. In this case, the RRC message of the gNB 121 may be transmitted through the SRB established between the gNB 121 and the UE 130 and (third DRB 1723-1-Xn-C interface 1740). The UE 130 may receive the RRC message of the gNB 121 through the SRB established between the gNB 121 and the UE 130 as well as (third DRB 1723-1-Xn-C interface 1740). That is, the RRC message of the gNB 121 may be transmitted based on a diversity scheme.

The Xn-C interface 1740 may indicate a transport layer used for transmitting and receiving the RRC message of the gNB 121. The Xn-C interface 1740 may support UDP, stream control transmission protocol (SCTP), and the like. When an RRC message for the mobility procedure (e.g., handover procedure) is transmitted and received via the Xn-C interface 1740, the RRC message may include a field for identifying a target base station and a source base station.

The RRC message for creation, modification, addition, or deletion of a communication path for the user plane between the gNB 121 and the UE 130 may be transmitted and received via (third DRB 1723-1-Xn-C interface 1740). Accordingly, (first NR-DRB 1731-1-fourth GTP-U tunnel 1731-2), (second NR-DRB 1732-2-fifth GTP-U tunnel 1732-2), and the like may be established. The first NR-DRB 1731-1 may be established between the UE 130 and the gNB 121, and the fourth GTP-U tunnel 1731-2 corresponding to the first NR-DRB 1731-1 may be established between the gNB 121 and the GW 110-2. The second NR-DRB 1732-1 may be established between the UE 130 and the gNB 121, and the fifth GTP-U tunnel 1732-2 corresponding to the second NR-DRB 1732-1 may be established between the gNB 121 and the GW 110-2.

Next, a method of state transition (e.g., an idle state to active state) of the gNB 121 in the communication system B-1 will be described.

Figure 18:
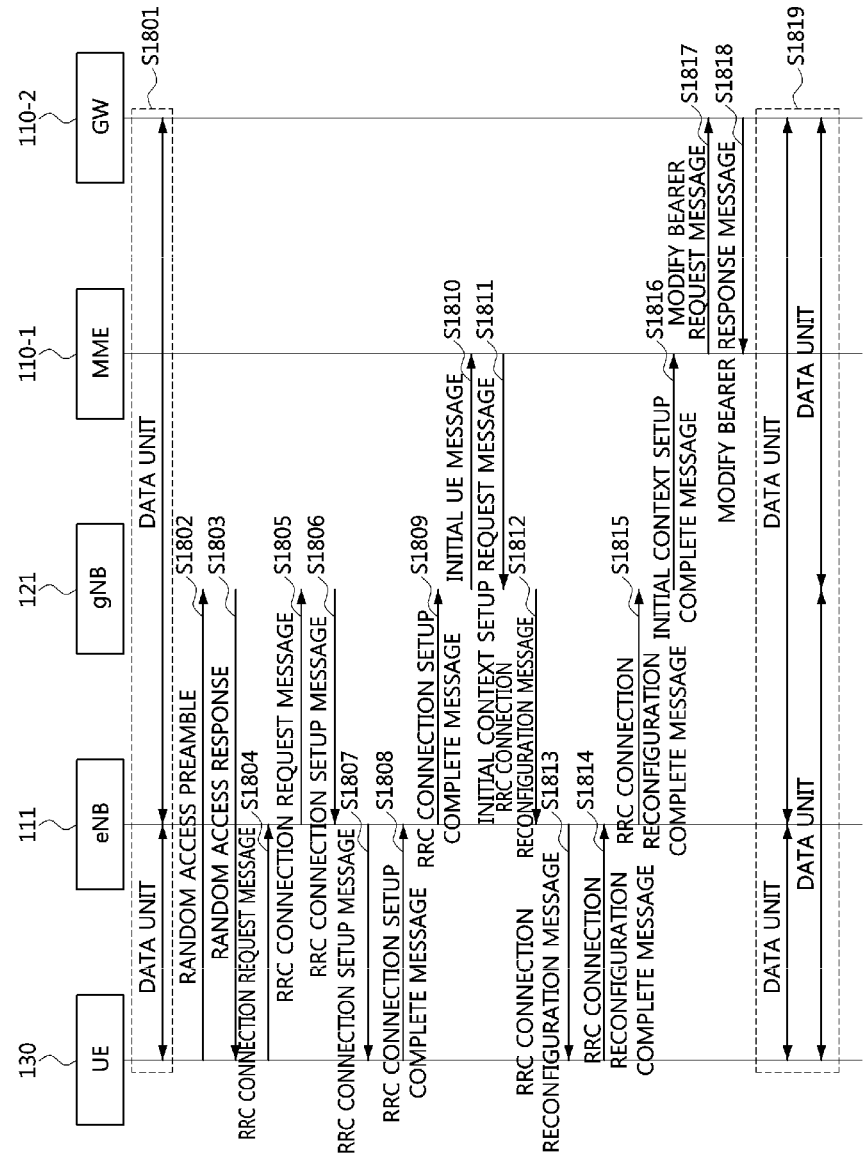
FIG. 18 is a sequence chart illustrating a first embodiment of a state transition method of a communication node in the communication system B-1.

FIG. 18 is a sequence chart illustrating a first embodiment of a state transition method of a communication node in the communication system B-1.

Referring to FIG. 18, the communication system B-1 may comprise an MME 110-1, a GW 110-2, an eNB 111, a gNB 121, a UE 130, and the like. Each of the MME 110-1, the GW 110-2, the eNB 111, the gNB 121, and the UE 130 may be the same as or similar to each of the MME 110-1, the GW 110-2, the eNB 111, the gNB 121, and the UE 130 shown in FIGS. 16 and 17. The RRC message used in the below RRC signaling procedure may be the same as or similar to the RRC message defined in the 3GPP. The RRC message of the gNB 121 may be transmitted and received through the Xn-C interface between the gNB 121 and the eNB 111 and the radio interface between the eNB 111 and the UE 130.

The communication path of (UE 130-eNB 111-GW 110-2) may be established through the RRC signaling procedure, and data units may be transmitted and received through the communication path of (UE 130-eNB 111-GW 110-2) (S1801). The UE 130 may perform a random access procedure with the gNB 121 in order to access the gNB 121. For example, the UE 130 may transmit a random access preamble to the gNB 121 (S1802). The gNB 121 may receive the random access preamble from the UE 130 and may transmit a random access response to the UE 130 in response to the random access preamble (S1803). The UE 130 may synchronize with gNB 121 by performing the random access procedure. Here, the random access procedure (e.g., the steps S1802 and S1803) between the UE 130 and the gNB 121 may be omitted. For example, an operation in which the UE 130 acquires a temporary radio network temporary identifier (T-RNTI) through the random access response, and an operation in which the UE 130 determines a C-RNTI based on the T-RNTI through contention resolution may be omitted.

The UE 130 attempting to connect to the gNB 121 may generate an RRC connection request message and transmit the generated RRC connection request message to the eNB 111 (S1804). The eNB 111 may receive the RRC connection request message from the UE 130 and transmit the RRC connection request message to the gNB 121 using the Xn-C interface (S1805). That is, the RRC connection request message may be transmitted to the gNB 121 via the eNB 111. The gNB 121 may receive the RRC connection request message from the eNB 111 and confirm that the connection between the UE 130 and the gNB 121 is requested based on the received RRC connection request message. The gNB 121 may generate an RRC connection setup message in response to the RRC connection request message. The RRC connection setup message may include a C-RNTI for the UE 130. The gNB 121 may transmit the RRC connection setup message to the eNB 111 using the Xn-C interface (S1806).

The eNB 111 may receive the RRC connection setup message from the gNB 121 and transmit the RRC connection setup message to the UE 130 (S1807). That is, the RRC connection setup message may be transmitted to the UE 130 via the eNB 111. The UE 130 may receive the RRC connection setup message from eNB 111 and may perform a connection setup procedure based on the received RRC connection setup message. When the connection setup procedure is completed, the UE 130 may generate an RRC connection setup complete message and transmit the RRC connection setup complete message to the eNB 111 (S1808). The eNB 111 may receive the RRC connection setup complete message from the UE 130 and transmit the RRC connection setup complete message to the gNB 121 using the Xn-C interface (S1809). That is, the RRC connection setup complete message may be transmitted to the gNB 121 via the eNB 111. The gNB 121 may receive the RRC connection setup complete message from the eNB 111 and determine that the connection setup procedure is completed based on the RRC connection setup complete message. When the connection setup procedure is completed, the gNB 121 may perform scheduling for the UE 130. A first SRB may be established between the UE 130 and the gNB 121 based on the signaling procedure described above (e.g., the steps S1804 to S1809).

Then, the gNB 121 may generate an initial UE message and may transmit the initial UE message to the MME 110-1 using the S1-C interface (S1810). The MME 110-1 may receive the initial UE message from the gNB 121 and may generate an initial context setup request message based on the initial UE message. The MME 110-1 may transmit the initial context setup request message to the gNB 121 using the S1-C interface (S1811). The gNB 121 may receive the initial context setup request message from the MME 110-1 and generate an RRC connection reconfiguration message based on the initial context setup request message. The gNB 121 may transmit the RRC connection reconfiguration message to the eNB 111 using the Xn-C interface (S1812). The eNB 111 may receive the RRC connection reconfiguration message from the gNB 121 and may transmit the RRC connection reconfiguration message to the UE 130 (S1813). That is, the RRC connection reconfiguration message may be transmitted to the UE 130 via the eNB 111.

The UE 130 may receive the RRC connection reconfiguration message from eNB 111 and may perform an operation based on the RRC connection reconfiguration message. The UE 130 may then generate an RRC connection reconfiguration complete message in response to the RRC connection reconfiguration message and may transmit the RRC connection reconfiguration complete message to the eNB 111 (S1814). The eNB 111 may receive the RRC connection reconfiguration completion message from the UE 130 and may transmit the RRC connection reconfiguration completion message to the gNB 121 using the Xn-C interface (S1815). That is, the RRC connection reconfiguration completion message may be transmitted to the gNB 121 via the eNB 111.

When the RRC connection reconfiguration completion message is received from the eNB 111, the gNB 121 may determine that the operation based on the RRC connection reconfiguration message (i.e., connection reconfiguration procedure) is completed. Accordingly, the gNB 121 may generate an initial context setup complete message in response to the initial context setup request message and transmit the initial context setup complete message to the MME 110-1 (S1816). When the initial context setup complete message is received from the gNB 121, the MME 110-1 may determine that the initial context setup procedure is completed.

Also, the MME 110-1 may generate a modify bearer request message and may transmit the modify bearer request message to the GW 110-2 using the GTP-C interface (S1817). The GW 110-2 may receive the modify bearer request message from MME 110-1 and perform an operation based on the modify bear request message. The GW 110-2 may then generate a modify bearer response message in response to the modify bearer request message and transmit the modify bearer response message to the MME 110-1 (S1818). When the modify bearer response message is received from the GW 110-2, the MME 110-1 may determine that the operation based on the modified bearer request message is completed. A second SRB and at least one DRB may be established between the UE 130 and the gNB 121 based on the signaling procedures described above (e.g., the steps S1810 to S1816).

Accordingly, data units may be transmitted and received through the communication path of 'UE 130-eNB 111-GW 110-2' and the communication path of 'UE 130-gNB 121-GW 110-2' (S1819). Meanwhile, even when the SRB is established between the UE 130 and the gNB 121 through the above-described signaling procedure, the RRC message of the gNB 121 may transmitted and received through the Xn-C interface and the radio interface between the eNB 111 and the UE 130, instead of the SRB.

Next, a method of configuring a secondary cell (e.g., SCell) in the communication system B-1 will be described.

Figure 19:
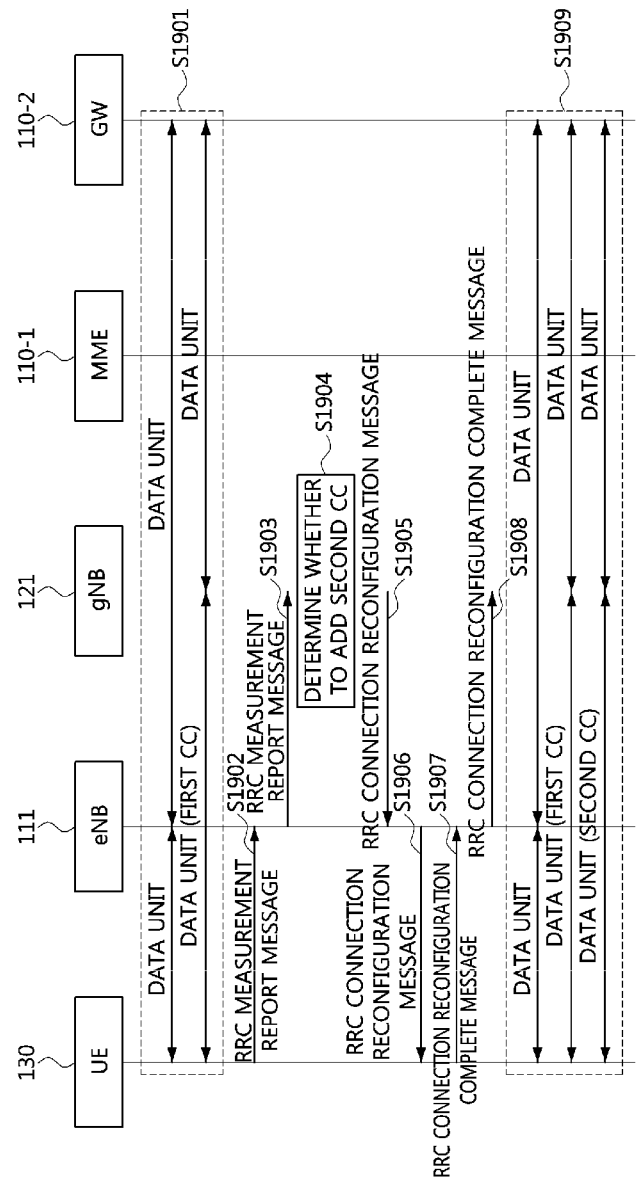
FIG. 19 is a sequence chart illustrating a first embodiment of a method of configuring a secondary cell in the communication system B-1.

FIG. 19 is a sequence chart illustrating a first embodiment of a method of configuring a secondary cell in the communication system B-1.

Referring to FIG. 19, the communication system B-1 may comprise an MME 110-1, a GW 110-2, an eNB 111, a gNB 121, a UE 130, and the like. Each of the MME 110-1, the GW 110-2, the eNB 111, the gNB 121, and the UE 130 may be the same as or similar to each of the MME 110-1, the GW 110-2, the eNB 111, the gNB 121, and the UE 130 shown in FIGS. 16 and 17. Here, the gNB 121 may perform communications using at least one SCell as well as a primary cell (PCell). The RRC message used in the below RRC signaling procedure may be the same as or similar to the RRC message defined in the 3GPP. The RRC message of the gNB 121 may be transmitted and received through the Xn-C interface between the gNB 121 and the eNB 111 and the radio interface between the eNB 111 and the UE 130.

A communication path of (UE 130-eNB 111-GW 110-2) and a communication path for a first CC of (UE 130-gNB 121-GW 110-2) may be established through the RRC signaling procedure, and data units may be transmitted and received through the communication path of (UE 130-eNB 111-GW 110-2) and the communication path for the first CC of (UE 130-gNB 121-GW 110-2). The first CC may be a PCell established between the UE 130 and the gNB 121.

Meanwhile, the UE 130 may measure signals received from the eNB 111, the gNB 121, etc. and identify a channel condition based on the measurement on the signals. For example, the UE 130 may measure signals received from the eNB 111, signals received through the first CC of the gNB 121, signals received through a second CC (i.e., SCell) of the gNB, and the like. The UE 130 may generate an RRC measurement report message including channel state information (e.g., received signal strength) and transmit the RRC measurement report message to the eNB 111 (S1902).

The eNB 111 may receive the RRC measurement report message from the UE 130 and may transmit the RRC measurement report message to the gNB 121 using the Xn-C interface (S1903). That is, the RRC measurement report message may be transmitted to the gNB 121 via the eNB 111.

The gNB 121 may receive the RRC measurement report message from the eNB 111 and may determine whether to add a SCell based on the channel state information included in the RRC measurement report message (S1904). Here, addition of a second CC may be determined in consideration of the capacity of the gNB 121. For example, when the received signal strength of the second CC of the gNB 121 indicated by the channel state information is equal to or larger than a preset threshold value, the gNB 121 may determine to add the second CC. In this case, the gNB 121 may generate an RRC connection reconfiguration message instructing addition of the second CC. In the RRC connection reconfiguration message, 'SCellToAddModList' may include information on the second CC. The gNB 121 may transmit the RRC connection reconfiguration message to the eNB 111 using the Xn-C interface (S1905). The eNB 111 may receive the RRC connection reconfiguration message from the gNB 121 and may transmit the RRC connection reconfiguration message to the UE 130 (S1906). That is, the RRC connection reconfiguration message may be transmitted to the UE 130 via the eNB 111.

The UE 130 may receive the RRC connection reconfiguration message from the eNB 111 and confirm that the addition of the second CC is requested based on the information in the received RRC connection reconfiguration message. Therefore, the UE 130 may perform an addition procedure for the second CC. Thereafter, the UE 130 may generate an RRC connection reconfiguration complete message and may transmit the RRC connection reconfiguration complete message to the eNB 111 (S1907).

The eNB 111 may receive the RRC connection reconfiguration complete message from the UE 130 and may transmit the RRC connection reconfiguration complete message to the gNB 121 using the Xn-C interface (S1908). That is, the RRC connection reconfiguration complete message may be transmitted to the gNB 121 via the eNB 111. Upon receiving the RRC connection reconfiguration complete message is received from the eNB 111, the gNB 121 may determine that the addition procedure for the second CC is completed. The second CC may be configured between the UE 130 and the gNB 121 through the above-described signaling procedure. Therefore, data units may be transmitted and received through the communication path of (UE 130-eNB 111-GW 110-2), and the communication paths for the first and second CCs of (UE 130-gNB 121-GW 110-2) (S1909).

Next, a method of releasing a secondary cell in the communication system B-1 will be described.

Figure 20:
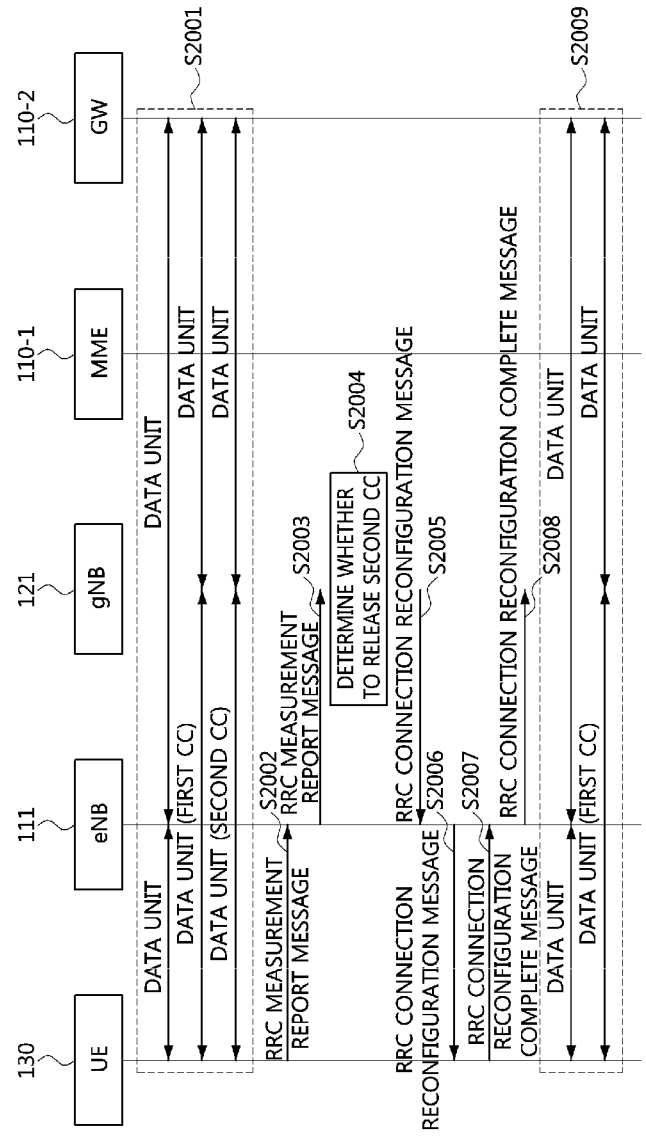
FIG. 20 is a sequence chart illustrating a first embodiment of a method of releasing a secondary cell in the communication system B-1.

FIG. 20 is a sequence chart illustrating a first embodiment of a method of releasing a secondary cell in the communication system B-1.

Referring to FIG. 20, the communication system B-1 may comprise an MME 110-1, a GW 110-2, an eNB 111, a gNB 121, a UE 130, and the like. Each of the MME 110-1, the GW 110-2, the eNB 111, the gNB 121, and the UE 130 may be the same as or similar to each of the MME 110-1, the GW 110-2, the eNB 111, the gNB 121, and the UE 130 shown in FIGS. 16 and 17. Here, the gNB 121 may perform communications using at least one SCell as well as the PCell. The RRC message used in the RRC signaling procedure may be the same as or similar to the RRC message defined in the 3GPP. The RRC message of the gNB 121 may be transmitted and received through the Xn-C interface between the gNB 121 and the eNB 111 and the radio interface between the eNB 111 and the UE 130.

Through the signaling procedure illustrated in FIG. 19, the communication path of (UE 130-eNB 111-GW 110-2) and the communication paths for the first and second CCs of (UE 130-gNB 121-GW 110-2) may be configured. Here, the first CC may be the PCell configured between the UE 130 and the gNB 121, and the second CC may be the SCell configured between the UE 130 and the gNB 121. Data units may be transmitted and received through the communication path of (UE 130-eNB 111-GW 110-2), and the communication paths for the first and second CCs of (UE 130-gNB 121-GW 110-2) (S2001).

Meanwhile, the UE 130 may measure signals received from the eNB 111, the gNB 121, etc. and identify a channel condition based on the measurement on the signals. For example, the UE 130 may measure signals received from the eNB 111, signals received through the first CC of the gNB 121, signals received through the second CC of the gNB, and the like. The UE 130 may generate an RRC measurement report message including channel state information (e.g., received signal strength) and transmit the RRC measurement report message to the eNB 111 (S2002). The eNB 111 may receive the RRC measurement report message from the UE 130 and may transmit the RRC measurement report message to the gNB 121 using the Xn-C interface (S2003). That is, the RRC measurement report message may be transmitted to the gNB 121 via the eNB 111.

The gNB 121 may receive the RRC measurement report message from the eNB 111 and may determine whether to release the SCell based on the channel state information included in the RRC measurement report message (S2004). Here, release of the second CC may be determined in consideration of the capacity of the gNB 121. For example, when the received signal strength of the second CC of the gNB 121 indicated by the channel state information is less than a preset threshold value, the gNB 121 may determine to release the second CC. In this case, the gNB 121 may generate an RRC connection reconfiguration message instructing release of the second CC. In the RRC connection reconfiguration message, 'SCellToReleaseList' may include information on the second CC. The gNB 121 may transmit the RRC connection reconfiguration message to the eNB 111 using the Xn-C interface (S2005). The eNB 111 may receive the RRC connection reconfiguration message from the gNB 121 and may transmit the RRC connection reconfiguration message to the UE 130 (S2006). That is, the RRC connection reconfiguration message may be transmitted to the UE 130 via the eNB 111.

The UE 130 may receive the RRC connection reconfiguration message from the eNB 111 and confirm that the release of the second CC is requested based on the information in the received RRC connection reconfiguration message. Therefore, the UE 130 may perform a release procedure for the second CC. Thereafter, the UE 130 may generate an RRC connection reconfiguration complete message and may transmit the RRC connection reconfiguration complete message to the eNB 111 (S2007). The eNB 111 may receive the RRC connection reconfiguration complete message from the UE 130 and may transmit the RRC connection reconfiguration complete message to the gNB 121 using the Xn-C interface (S2008). That is, the RRC connection reconfiguration complete message may be transmitted to the gNB 121 via the eNB 111. Upon receiving the RRC connection reconfiguration complete message is received from the eNB 111, the gNB 121 may determine that the release procedure for the second CC is completed. The second CC between the UE 130 and the gNB 121 may be released through the above-described signaling procedure. Therefore, data units may be transmitted and received through the communication path of (UE 130-eNB 111-GW 110-2), and the communication path for the first CC of (UE 130-gNB 121-GW 110-2) (S2009).

Next, a method of recovering a radio link failure (RLF) in the communication system B-1 will be described.

Figure 21:
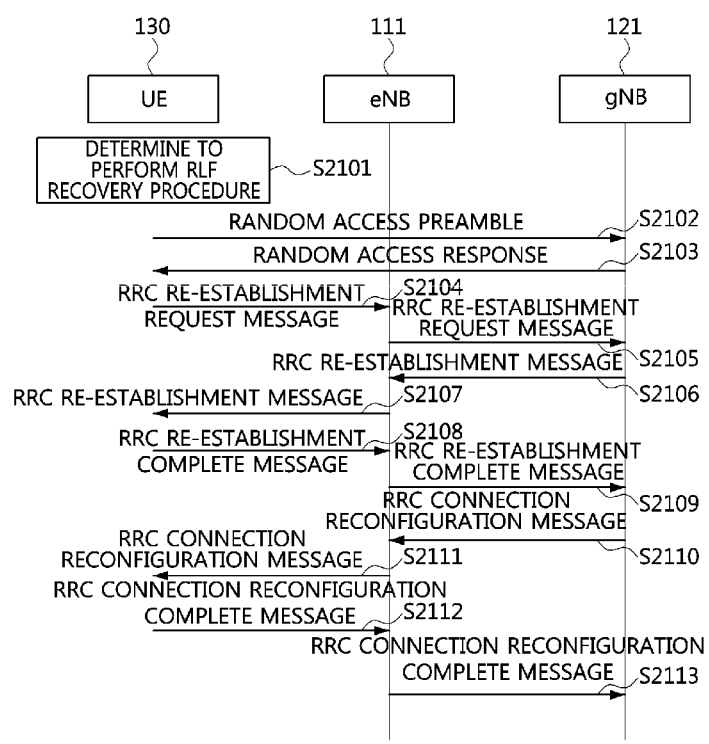
FIG. 21 is a sequence chart illustrating a first embodiment of a method of recovering an RLF in the communication system B-1.

FIG. 21 is a sequence chart illustrating a first embodiment of a method of recovering an RLF in the communication system B-1.

Referring to FIG. 21, the communication system B-1 may comprise an eNB 111, a gNB 121, a UE 130, and the like. Each of the eNB 111, the gNB 121, and the UE 130 may be the same as or similar to each of the eNB 111, the gNB 121, and the UE 130 shown in FIGS. 16 and 17. The RRC message used in the below RRC signaling procedure may be the same as or similar to the RRC message defined in the 3GPP. The RRC message of the gNB 121 may be transmitted and received through the Xn-C interface between the gNB 121 and the eNB 111 and the radio interface between the eNB 111 and the UE 130.

In case that an RLF is detected at the radio interface between the UE 130 and the gNB 121, the UE 130 may determine to perform a RLF recovery procedure (S2101). In this case, the UE 130 may transmit a random access preamble to the gNB 121 (S2102). The gNB 121 may receive the random access preamble from UE 130 and may generate a random access response in response to the random access preamble. The gNB 121 may transmit the random access response to UE 130 (S2103). The UE 130 may receive the random access response from gNB 121.

Thereafter, the UE 130 may generate an RRC re-establishment request message for the RLC recovery and may transmit the RRC re-establishment request message to the eNB 111 (S2104). The eNB 111 may then receive the RRC re-establishment request message from the UE 130 and may transmit the RRC re-establishment request message to the gNB 121 using the Xn-C interface (S2105). That is, the RRC re-establishment request message may be transmitted to the gNB 121 via the eNB 111. When the RRC re-establishment request message is received from the eNB 111, the gNB 121 may determine that the RLF recovery is requested. Accordingly, the gNB 121 may generate an RRC re-establishment message in response to the RRC re-establishment request message and may transmit the RRC re-establishment message to the eNB 111 using the Xn-C interface (S2106). The eNB 111 may then receive the RRC re-establishment message from the gNB 121 and may transmit the RRC re-establishment message to the UE 130 (S2107). That is, the RRC re-establishment message may be transmitted to the UE 130 via the eNB 111.

Upon receiving the RRC re-establishment message from the eNB 111, the UE 130 may perform an operation based on the RRC re-establishment message. Thereafter, the UE 130 may generate an RRC re-establishment complete message and may transmit the RRC re-establishment complete message to the eNB 111 (S2108). The eNB 111 may receive the RRC re-establishment complete message from the UE 130 and may transmit the RRC re-establishment complete message to the gNB 121 using the Xn-C interface (S2109). That is, the RRC re-establishment complete message may be transmitted to the gNB 121 through the eNB 111. When the RRC re-establishment complete message is received from the eNB 111, the gNB 121 may determine that the re-establishment procedure is complete.

Thereafter, the gNB 121 may generate an RRC connection reconfiguration message and may transmit the RRC connection reconfiguration message to the eNB 111 using the Xn-C interface (S2110). The eNB 111 may receive the RRC connection reconfiguration message from the gNB 121 and may transmit the RRC connection reconfiguration message to the UE 130 (S2111). That is, the RRC connection reconfiguration message may be transmitted to the UE 130 via the eNB 111.

When the RRC connection reconfiguration message is received from the eNB 111, the UE 130 may perform an operation based on the RRC connection reconfiguration message. When the operation based on the RRC connection reconfiguration message is completed, the UE 130 may generate an RRC connection reconfiguration complete message and may transmit the RRC connection reconfiguration complete message to the eNB 111 (S2112). The eNB 111 may receive the RRC connection reconfiguration complete message from the UE 130 and may transmit the RRC connection reconfiguration complete message to the gNB 121 using the Xn-C interface (S2113). That is, the RRC connection reconfiguration complete message may be transmitted to the gNB 121 via the eNB 111. When the RRC connection reconfiguration complete message is received from the eNB 111, the gNB 121 may determine that the connection reconfiguration procedure is completed. The RLF may be recovered by the signaling procedure described above.

Next, a method for handover between gNBs will be described.

Figure 22:
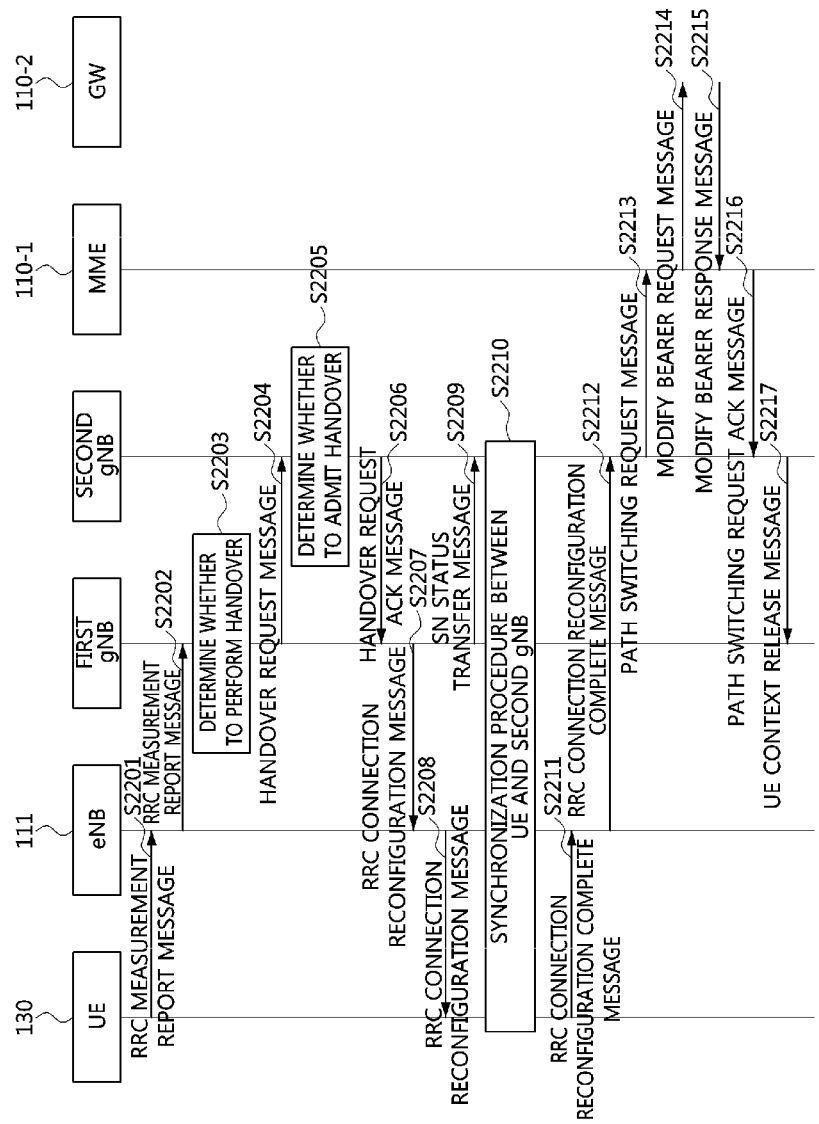
FIG. 22 is a sequence chart illustrating a first embodiment of a handover method in the communication system B-1.

FIG. 22 is a sequence chart illustrating a first embodiment of a handover method in the communication system B-1.

Referring to FIG. 22, the communication system B-1 may comprise an MME 110-1, a GW 110-2, an eNB 111, a first gNB, a second gNB, a UE 130, and the like. The first gNB may be a source base station of the UE 130, and the second gNB may be a target base station of the UE 130. Each of the MME 110-1, the GW 110-2, the eNB 111, and the UE 130 may be identical or similar to each of the MME 110-1, the GW 110-2, the eNB 111, and the UE 130 shown in FIGS. 16 and 17. Also, each of the first gNB and the second gNB may be identical or similar to the gNB 121 shown in FIGS. 16 and 17. For example, the communications between the first gNB (or the second gNB) and the MME 110-1 may be performed based on the S1-C interface, the communications between the first gNB (or the second gNB) and the GW 110-2 may be performed based on the S1-U interface, the communications between the first gNB (or the second gNB) and the eNB 111 may be performed based on the Xn-C interface, and the communications between the first gNB and the second gNB may be performed based on the Xn_C interface. The RRC message used in the RRC signaling procedure may be the same as or similar to the RRC message defined in the 3GPP. The RRC message of the first gNB (or, the second gNB) may be transmitted and received through the Xn-C interface between the first gNB (or, the second gNB) and the eNB 111 and the radio interface between the eNB 111 and the UE 130.

The UE 130 may be connected to the first gNB and may receive channel measurement information from the first gNB. The channel measurement information may include an object to be measured, a measurement scheme, and the like. The UE 130 may measure signals received from the eNB 111, the first gNB, the second gNB, etc. and identify a channel condition based on the measurement on the signals. The UE 130 may generate an RRC measurement report message including channel state information (e.g., received signal strength) and transmit the RRC measurement report message to the eNB 111 (S2201).

The eNB 111 may receive the RRC measurement report message from the UE 130, and transmit the RRC measurement report message to the first gNB using the Xn-C interface (S2202). That is, the RRC measurement report message may be transmitted to the first gNB via the eNB 111. The first gNB may receive the RRC measurement report message from the UE 130 and may determine whether to perform a handover based on the channel state information included in the RRC measurement report message (S2203). For example, when the received signal strength of the second gNB is greater than the received signal strength of the first gNB or when the received signal strength of the second gNB is greater than (the received signal strength of the first gNB+a predetermined margin), the first gNB may determine to perform a handover from the first gNB to the second gNB. In this case, the first gNB may generate a handover request message and transmit the handover request message to the second gNB using the Xn-C interface (S2204).

When the handover request message is received from the first gNB, the second gNB may determine whether to admit the handover procedure (S2205). If the handover procedure is admitted, the second gNB may prepare a handover request ACK message including information required for the handover procedure, and transmit the handover request ACK message to the first gNB using the Xn-C interface (S2206). Here, the handover request ACK message may indicate that the handover procedure is admitted.

When the handover request ACK message is received from the second gNB, the first gNB may determine that the handover procedure is admitted. In this case, the first gNB may generate an RRC connection reconfiguration message instructing initiation of the handover procedure. The RRC connection reconfiguration message may include mobility control information. The first gNB may transmit the RRC connection reconfiguration message to the eNB 111 using the Xn-C interface (S2207). The eNB 111 may receive the RRC connection reconfiguration message from the first gNB and transmit the RRC connection reconfiguration message to the UE 130 (S2208). That is, the RRC connection reconfiguration message may be transmitted to the UE 130 via the eNB 111.

Also, the first gNB may generate an SN status transfer message. The SN status transfer message may include UL/DL PDCP SN status information. The first gNB may transmit the SN status transfer message to the second gNB using the Xn-C interface (S2209). The first GNB may also transmit data units (e.g., data units received from the UE 130, data units to be transmitted to the UE 130, etc.) to the second gNB using the Xn-C interface. The second gNB may receive the SN status transfer message and the data units from the first gNB and identify the information included in the SN status transfer message.

Meanwhile, when the RRC connection reconfiguration message is received from the eNB 111, the UE 130 may perform a synchronization procedure with the second gNB (S2210). For example, the UE 130 may transmit a random access preamble to the second gNB. The second gNB may receive the random access preamble from the UE 130, generate a random access response in response to the random access preamble, and transmit the random access response to the UE 130. The UE 130 may receive the random access response from the second gNB. That is, the UE 130 may synchronize with the second gNB by performing the random access procedure with the second gNB.

When the handover procedure is completed, the UE 130 may generate an RRC connection reconfiguration complete message indicating completion of the handover procedure, and may transmit the RRC connection reconfiguration complete message to the eNB 111 (S2211). The eNB 111 may receive the RRC connection reconfiguration complete message from the UE 130 and transmit the RRC connection reconfiguration complete message to the second gNB (S2212). That is, the RRC connection reconfiguration complete message may be transmitted to the second gNB through the eNB 111. When the RRC connection reconfiguration complete message is received from the UE 130, the second gNB may determine that the handover procedure is completed in the UE 130. Then, the second gNB may perform a path switch procedure with the MME 110-1. For example, the second gNB may generate a path switching request message informing that the cell to which the UE 130 is connected is changed, and transmit the path switching request message to the MME 110-1 using the S1-C interface (S2213). When the path switching request message is received, the MME 110-1 may confirm that the cell to which the UE 130 is connected is changed and may generate a modify bearer request message. The MME 110-1 may transmit the modify bearer request message to the GW 110-2 using the GTP-C interface (S2214).

The GW 110-2 may receive the modify bearer request message from the MME 110-1 and perform an operation based on the modify bearer request message. The GW 110-2 may then generate a modify bearer response message in response to the modify bearer request message and transmit the modify bearer response message to the MME 110-1 (S2215). When the modify bearer response message is received from the GW 110-2, the MME 110-1 may determine that the modification of bearer is complete and may generate a path switching request ACK message. The MME 110-1 may transmit the path switching request ACK message to the second gNB using the S1-C interface (S2216).

When the path switching request ACK message is received from the MME 110-1, the second gNB may determine that the path switching procedure is completed. The second gNB may then generate a UE context release message instructing to delete the context of the UE 130 and may transmit the UE context release message to the first gNB using the Xn-C interface (S2217). Upon receiving the UE context release message from the second gNB, the first gNB may delete the context of the UE 130 based on the UE context release message.

Operation of Communication System E-1

In the communication system E-1, a communication node may perform communications using a millimeter-wave based beamforming technique. When the millimeter-wave based beamforming technique is used, signal quality may be degraded due to linearity of a beam, mobility of the UE 130, and the like. Therefore, methods for preventing deterioration of signal quality will be required. A resource reservation method in a recovery of an RLF due to the mobility of the UE 130 may be as follows.

Figure 23:
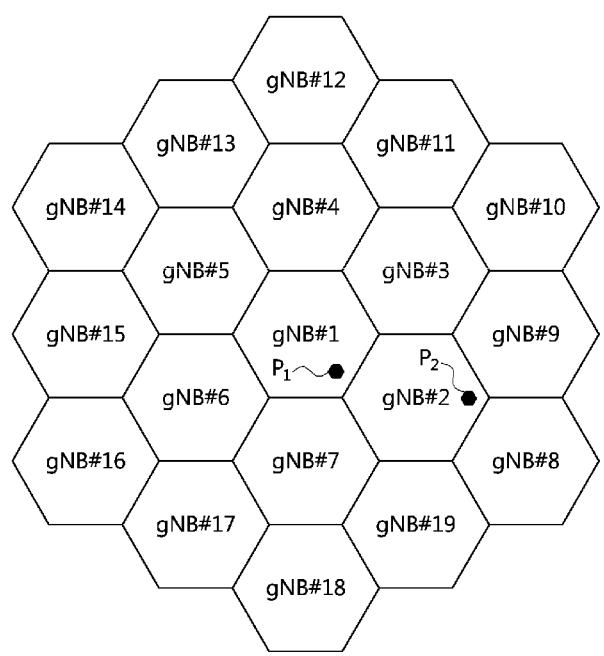
FIG. 23 is a conceptual diagram illustrating a first embodiment of a resource reservation method in an RLF recovery procedure.

FIG. 23 is a conceptual diagram illustrating a first embodiment of a resource reservation method in an RLF recovery procedure.

Referring to FIG. 23, each of gNBs may form a cell, and the UE 130 may be located at $P_1$ in a cell of the first gNB. That is, the first gNB (i.e., gNB #1) may be a serving base station to which the UE 130 is connected. When the UE 130 moves from the cell (e.g., $P_1$) of the first gNB to a cell (e.g., $P_2$) of the second gNB (i.e., gNB #2), an RLF may occur. In this case, the cell that can be recovered by the RLF recovery procedure may be a cell of each of second to seventh gNBs, which is a 1-tier cell from the first gNB. Thus, for the RLF recovery procedure for the UE 130, resources of the second to seventh gNBs (i.e., gNB #2 to gNB #7) may be reserved.

Also, cells of eighth to nineteenth gNBs (i.e., gNB #8 to gNB #19), which are 2-tier cells from the first gNB, can also be recovered by the RLF recovery procedure. Therefore, for the RLF recovery procedure for the UE 130, not only the resources of the second to seventh gNBs but also the resources of the eighth to nineteenth gNBs may be reserved. In this case, the RLF recovery procedure may be performed efficiently, but unnecessary resources may be reserved. In order to solve this problem, the range of the resource reservation may be determined in consideration of the position of the UE 130.

For example, if the UE 130 is located at $P_1$, resources of the second, third, and seventh gNBs which are adjacent to $P_1$ may be reserved for the RLF recovery procedure. If the UE 130 is located at $P_2$, resources of the eighth, ninth, nineteenth gNBs which are adjacent to $P_2$ may be reserved for the RLF recovery procedure. Also, resources for the RLF recovery procedure may be reserved in consideration of the moving speed and the moving direction of the UE 130 as well as the position of the UE 130.

Next, methods for reserving resources in a handover procedure (or the RLF recovery procedure) of the communication system E-1 will be described.

Figure 24:
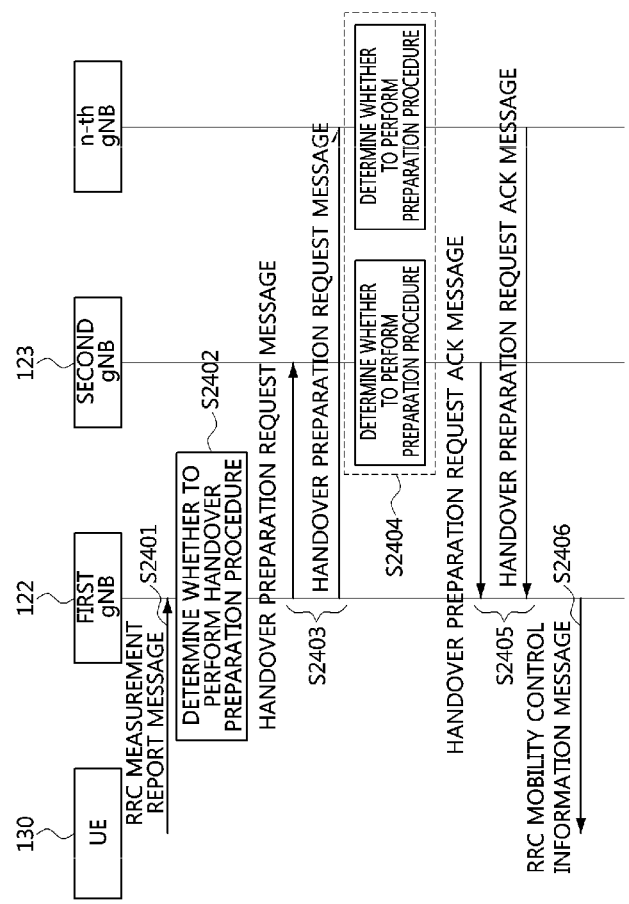
FIG. 24 is a sequence chart illustrating a first embodiment of a resource reservation method in the communication system E-1.

FIG. 24 is a sequence chart illustrating a first embodiment of a resource reservation method in the communication system E-1.

Referring to FIG. 24, the communication system E-1 may comprise a first gNB 122, a second gNB 123, an n-th gNB, a UE 130, and the like. Each of the first gNB 122, the second gNB 123, and the UE 130 may be the same as or similar to the first gNB 122, the second gNB 123*m* and the UE 130 shown in FIG. 7. Each of the first gNB 122, the second gNB 123, and the n-th gNB may form the cell shown in FIG. 23.

The n-th gNB may be one of the third to nineteenth gNBs. The communications between the gNBs (e.g., the first gNB 122, the second gNB 123, and the n-th gNB) may be performed based on the Xn-C interface, and the communications between the gNB (e.g., the first gNB 122, the second gNB 123, or the n-th gNB) and the UE 130 may be performed based on the radio interface. The RRC message used in the RRC signaling procedure may be the same as or similar to the RRC message defined in the 3GPP.

The UE 130 connected to the first gNB 122 may measure signals received from the communication nodes (e.g., the 1-tier and 2-tier base stations from the first gNB 122 in FIG. 23), and identify channel conditions based on the measurement on the signals. The UE 130 may generate an RRC measurement report message that includes channel state information (e.g., received signal strength). For example, when the received signal strength is above a predetermined threshold value, the UE 130 may generate the RRC measurement report message. Here, the predetermined threshold value may be the received signal strength of the first gNB or (the received signal strength of the first gNB+a predetermined margin).

The UE 130 may transmit the RRC measurement report message to the first gNB 122 (S2401). The RRC measurement report message may indicate that a target base station for a handover procedure (or RLF recovery procedure) exists. The first gNB 122 may receive the RRC measurement report message from the UE 130 and determine whether to perform a preparation procedure for a handover (or RLF recovery) based on the RRC measurement report message (S2402). When it is determined that the handover (or RLF recovery) preparation procedure is to be performed, the first gNB 122 may generate a handover preparation request message, and may transmit the handover preparation request message using the Xn-C interface (S2403).

The handover preparation request message may be transmitted to the neighboring base stations of the first gNB 122. Alternatively, the handover preparation request message may be transmitted to the target base station for the handover procedure (or RLF recovery procedure) determined based on the RRC measurement report message. For example, if the target base station for the handover procedure (or the RLF recovery procedure) determined based on the RRC measurement report message is the second gNB 123 and the n-th gNB, the handover preparation request message may be transmitted to the second gNB 123 and the n-th gNB. Alternatively, the handover preparation request message may be transmitted considering the position of the UE 130. For example, when the UE 130 is located at $P_1$ in FIG. 23, the handover preparation request message may be transmitted to the second to seventh gNBs, or to the second, third, and seventh gNBs.

In the following description, it is assumed that the handover preparation request message is received at the second gNB 123 and the n-th gNB. When the handover preparation request message is received from the first gNB 122, each of the second gNB 123 and the n-th gNB may determine whether to perform a handover (or RLF recovery) preparation procedure (S2404). When it is determined that the preparation procedure of handover (or RLF recovery) is performed, each of the second gNB 123 and the n-th gNB may generate a handover preparation request ACK message. The handover preparation request ACK message may include preparation information for the handover (or RLF recovery) in each of the second gNB 123 and the n-th gNB. Each of the second gNB 123 and the n-th gNB may transmit the handover preparation request ACK message to the first gNB 122 using the Xn-C interface (S2405).

The first gNB 122 may receive the handover preparation request ACK message from the second gNB 123 and the n-th gNB, and generate mobility control information based on the handover preparation request ACK message. For example, the first gNB 122 may generate mobility control information of the second gNB 123, mobility control information of the n-th gNB, and the like. Thereafter, the first gNB 122 may generate an RRC mobility control information message including at least one of the mobility control information, and transmit the RRC mobility control information message to the UE 130 (S2406).

The RRC mobility control information message may include mobility control information of the second gNB 123, mobility control information of the n-th gNB, and the like. Alternatively, the mobility control information included in the RRC mobility control information message may be determined in consideration of the position of the UE 130. For example, in the case that the position of the UE 130 is $P_1$ of FIG. 23, the RRC mobility control information message may include mobility control information of each of the second to seventh gNBs or mobility control information of each of the second, third, and seventh gNBs. The UE 130 may receive the RRC mobility control information message from the first gNB and may perform a handover procedure (or an RLF recovery procedure) based on the RRC mobility control information message. Here, the step S2406 may be selectively performed.

Next, methods for releasing reserved resources in the handover procedure (or RLF recovery procedure) of the communication system E-1 will be described.

Figure 25:
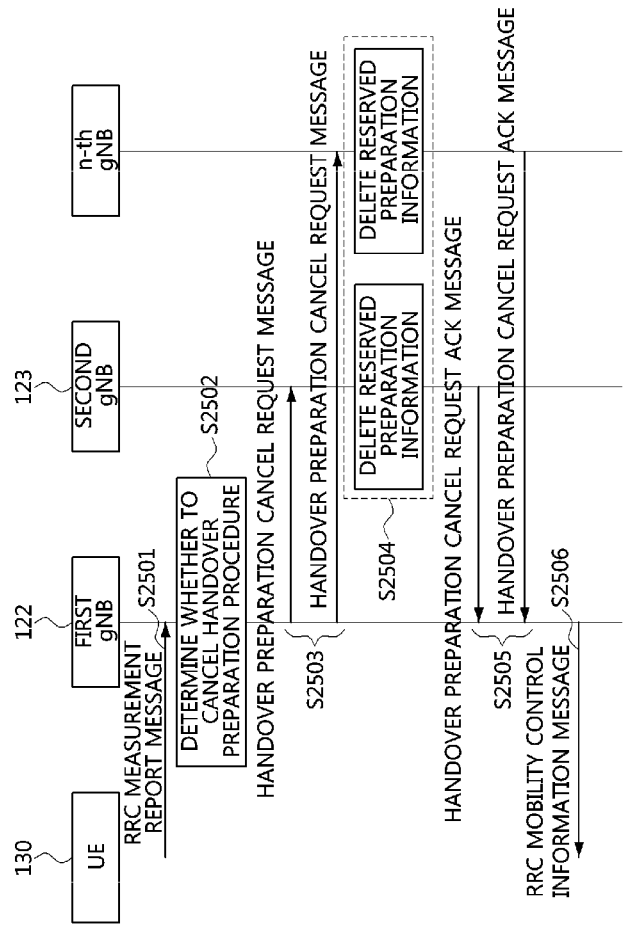
FIG. 25 is a sequence chart illustrating a first embodiment of a resource release method in the communication system E-1.

FIG. 25 is a sequence chart illustrating a first embodiment of a resource release method in the communication system E-1.

Referring to FIG. 25, the communication system E-1 may comprise a first gNB 122, a second gNB 123, an n-th gNB, a UE 130, and the like. Each of the first gNB 122, the second gNB 123, and the UE 130 may be the same as or similar to the first gNB 122, the second gNB 123*m* and the UE 130 shown in FIG. 7. Each of the first gNB 122, the second gNB 123, and the n-th gNB may form the cell shown in FIG. 23. The n-th gNB may be one of the third to nineteenth gNBs. The communications between the gNBs (e.g., the first gNB 122, the second gNB 123, or the n-th gNB) may be performed based on the Xn-C interface, and the communications between the gNB (e.g., the first gNB 122, the second gNB 123, or the n-th gNB) and the UE 130 may be performed based on the radio interface. The RRC message used in the RRC signaling procedure may be the same as or similar to the RRC message defined in the 3GPP.

The UE 130 connected to the first gNB 122 may measure signals received from the communication nodes (e.g., the 1-tier and 2-tier base stations from the first gNB 122 in FIG. 23), and identify channel conditions based on the measurement on the signals. The UE 130 may generate an RRC measurement report message that includes channel state information (e.g., received signal strength). For example, when the received signal strength is less than a predetermined threshold value, the UE 130 may generate the RRC measurement report message. Here, the predetermined threshold value may be the received signal strength of the first gNB or (the received signal strength of the first gNB+a predetermined margin).

The UE 130 may transmit the RRC measurement report message to the first gNB 122 (S2501). The first gNB 122 may receive the RRC measurement report message from the UE 130 and determine whether to cancel a preparation procedure for a handover (or RLF recovery) based on the RRC measurement report message (S2502). When it is determined that the handover (or RLF recovery) preparation procedure is to be cancelled, the first gNB 122 may generate a handover preparation cancel request message, and may transmit the handover preparation cancel request message using the Xn-C interface (S2503). The handover preparation cancel request message may be transmitted to the neighboring base stations of the first gNB 122. Alternatively, the handover preparation cancel request message may be transmitted to a base station indicated by the RRC measurement report message. For example, the handover preparation cancel request message may be transmitted to a base station having a received signal strength less than the received signal strength of the first gNB or (the received signal strength of the first gNB+a predetermined margin).

In the following description, it is assumed that the handover preparation cancel request message is received at the second gNB 123 and the n-th gNB. When the handover preparation cancel request message is received from the first gNB 122, each of the second gNB 123 and the n-th gNB may determine whether to delete preparation information reserved for the handover procedure (or RLF recovery procedure). For example, when the deletion of the preparation information reserved at the second gNB 123 and the n-th gNB is requested according to the handover preparation cancel request message, the second gNB 123 and the n-th gNB may check whether or not the preparation information reserved for the handover procedure (or, RLF recovery procedure) of the UE 130 exists. If the reserved preparation information exists, the second gNB 123 and the n-th gNB may delete the reserved preparation information (S2504). Then, the second gNB 123 and the n-th gNB may generate a handover preparation cancel request ACK message indicating the deletion of the reserved preparation information, and transmit the handover preparation cancel request ACK message to the first gNB 122 using the Xn-C interface (S2505).

The first gNB 122 may receive the handover preparation cancel request ACK message from the second gNB 123 and the n-th gNB, and delete the mobility control information based on the handover preparation cancel request ACK message. For example, the first gNB may delete the mobility control information of the second gNB 123 and the n-th gNB. Thereafter, the first gNB 122 may generate an RRC mobility control information message indicating the deleted mobility control information, and may transmit the RRC mobility control information message to the UE 130 (S2506). The UE 130 may receive the RRC mobility control information message from the first gNB, and delete the mobility control information indicated by the RRC mobility control information message. For example, the UE 130 may delete the mobility control information of the second gNB 123 and the n-th gNB. Here, the step S2506 may be performed selectively.

Next, in the communication system E-1, the handover procedure may be performed as follows.

Figure 26:
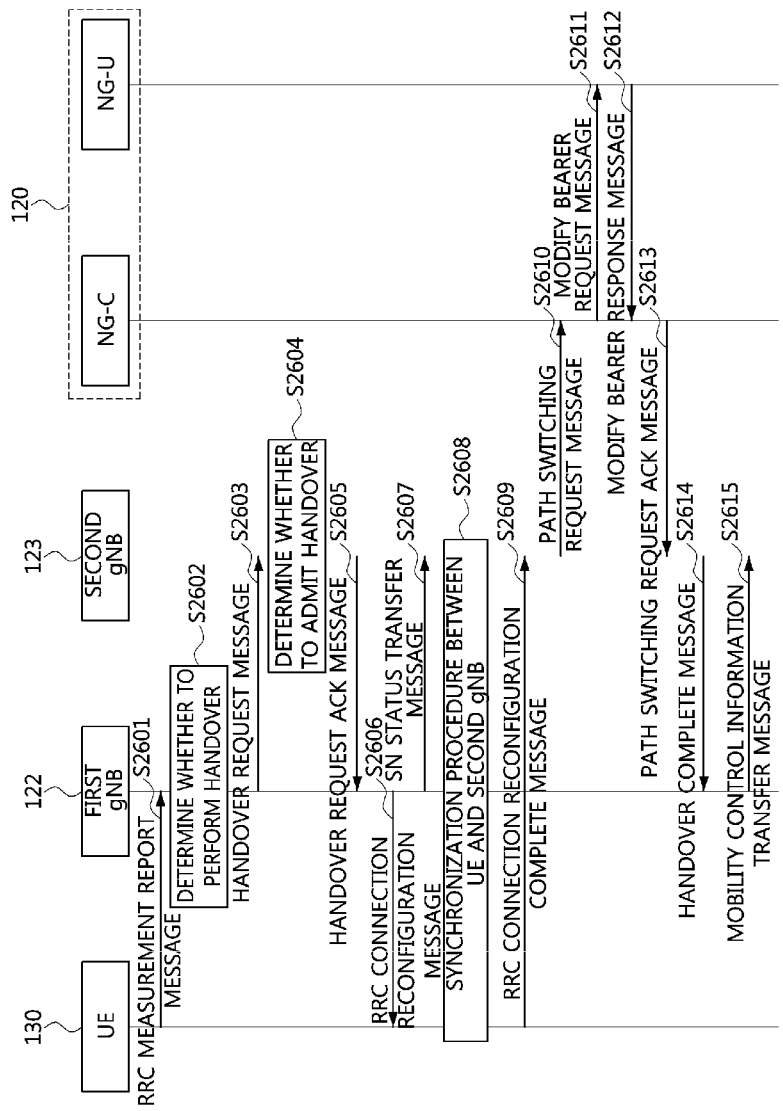
FIG. 26 is a sequence chart illustrating a first embodiment of a handover procedure in the communication system E-1.

FIG. 26 is a sequence chart illustrating a first embodiment of a handover procedure in the communication system E-1.

Referring to FIG. 26, the communication system E-1 may comprise an NGC 120, a first gNB 122, a second gNB 123, a UE 130, and the like. The NGC 120 may include NG-C and NG-U. Each of the NGC 120, the first gNB 122, the second gNB 123, and the UE 130 may be the same as or similar to each of the NGC 120, the first gNB 122, the second gNB 123, and the UE 130 shown in FIG. 7. The communications between the NG-C and the NG-U may be performed based on the STP-C interface, the communications between the NG-C and the gNB (e.g., the first gNB 122 or the second gNB 123) may be performed based on the NG-C interface, the communications between the gNBs (e.g., the first gNB 122 and the second gNB 123) may be performed based on the Xn-C interface, and the communications between the gNB (e.g., the first gNB 122 or the second gNB 123) and the UE 130 may be performed based on the radio interface. The RRC message used in the RRC signaling procedure may be the same as or similar to the RRC message defined in the 3GPP.

The UE 130 connected to the first gNB 122 may measure signals received from the communication nodes (e.g., the 1-tier and 2-tier base stations from the first gNB 122 in FIG. 23), and identify channel conditions based on the measurement on the signals. The UE 130 may generate an RRC measurement report message that includes channel state information (e.g., received signal strength). For example, when the received signal strength is equal to or greater than a predetermined threshold value, the UE 130 may generate the RRC measurement report message. Here, the predetermined threshold value may be the received signal strength of the first gNB 122 or (the received signal strength of the first gNB 122+a predefined margin). The UE 130 may transmit the RRC measurement report message to the first gNB 122 (S2601).

The first gNB 122 may receive the RRC measurement report message from the UE 130 and determine whether to perform a handover procedure based on the RRC measurement report message (S2602). When it is determined that the handover from the first gNB 122 to the second gNB 123 is to be performed, the first gNB 122 may check whether or not the mobility control information (e.g., the mobility control information obtained based on the method shown in FIG. 24) of the second gNB 123 exists.

When the mobility control information of the second gNB 123 does not exist or when it is necessary to re-confirm the mobility control information of the second gNB 123, steps S2603 to S2605 may be performed. For example, the first gNB 122 may generate a handover request message and transmit the handover request message to the second gNB 123 (i.e., a target base station) using the Xn-C interface S2603). When the handover request message is received from the first gNB 122, the second gNB 123 may determine whether to admit the handover procedure (S2604). If the handover procedure is admitted, the second gNB 123 may generate a handover request ACK message in response to the handover request message and transmit the handover request ACK message to the first gNB 122 (S2605). When the handover request ACK message is received from the second gNB 123, the first gNB 122 may determine that the handover procedure is admitted by the second gNB 123.

On the other hand, when the mobility control information of the second gNB 123 exists or obtained through the steps S2603 to S2605, the first gNB 122 may generate an RRC connection reconfiguration message including the mobility control information of the second gNB 123, and transmit the RRC connection reconfiguration message to the UE 130 (S2606).

Also, the first gNB 122 may generate an SN status transfer message. The SN status transfer message may include UL/DL PDCP SN status information. The first gNB 122 may transmit the SN status transfer message to the second gNB 123 using the Xn-C interface (S2607). The first gNB 122 may also transmit data units (e.g., data units received from the UE 130, data units to be transmitted to the UE 130, etc.)

to the second gNB 123 using the Xn-C interface. The second gNB 123 may receive the SN status transfer message and the data units from the first gNB 122 and identify the information included in the SN status transfer message.

When the RRC connection reconfiguration message is received from the first gNB 122, the UE 130 may perform a synchronization procedure with the second gNB 123 (S2608). For example, the UE 130 may transmit a random access preamble to the second gNB 123. The second gNB 123 may receive the random access preamble from the UE 130, generate a random access response in response to the random access preamble, and transmit the random access response to the UE 130. The UE 130 may receive the random access response from the second gNB 123. That is, the UE 130 may synchronize with the second gNB 123 by performing the random access procedure with the second gNB 123.

When the handover procedure is completed, the UE 130 may generate an RRC connection reconfiguration complete message indicating completion of the handover procedure, and may transmit the RRC connection reconfiguration complete message to the second gNB 123 (S2609). When the RRC connection reconfiguration complete message is received from the UE 130, the second gNB 123 may determine that the handover procedure is completed in the UE 130. Then, the second gNB 123 may perform a path switching procedure with the NGC 120. For example, the second gNB 123 may generate a path switching request message informing that the cell to which the UE 130 is connected is changed, and transmit the path switching request message to the NG-C using the NG-C interface (S2610). When the path switching request message is received from the second gNB 123, the NG-C may confirm that the cell to which the UE 130 is connected is changed and may generate a modify bearer request message. The NG-C may transmit the modify bearer request message to the NG-U using the STP-C interface (S2611).

The NG-U may receive the modify bearer request message from the NG-C and perform an operation based on the modify bearer request message. The NG-U may then generate a modify bearer response message in response to the modify bearer request message and transmit the modify bearer response message to the NG-C using the STP-C interface (S2612). When the modify bearer response message is received from the NG-U, the NG-C may determine that the modification of bearer is complete and may generate a path switching request ACK message. The NG-C may transmit the path switching request ACK message to the second gNB 123 using the NG-C interface (S2613).

When the path switching request ACK message is received from the NG-C, the second gNB 123 may determine that the path switching procedure is completed. Thereafter, the second gNB 123 may generate a handover complete message and transmit the handover complete message to the first gNB 122 using the Xn-C interface (S2614). When the handover complete message is received from the second gNB 123, the first gNB 122 may generate a mobility control information transfer message including the mobility control information, and transmit the mobility control information transfer message to the second gNB 123 using the Xn-C interface (S2615). The mobility control information included in the mobility control information transfer message may be the mobility control information obtained by the method shown in FIG. 24. When the mobility control information transfer message is received from the first gNB 122, the second gNB 123 may identify the information included in the mobility control information transfer message. Also, the second gNB 123 may update (add, change, or delete) the mobility control information by performing the steps S2403 to S2405 shown in FIG. 24 or the steps S2503 to S2505 shown in FIG. 25 based on the mobility control information transfer message.

Figure 27:
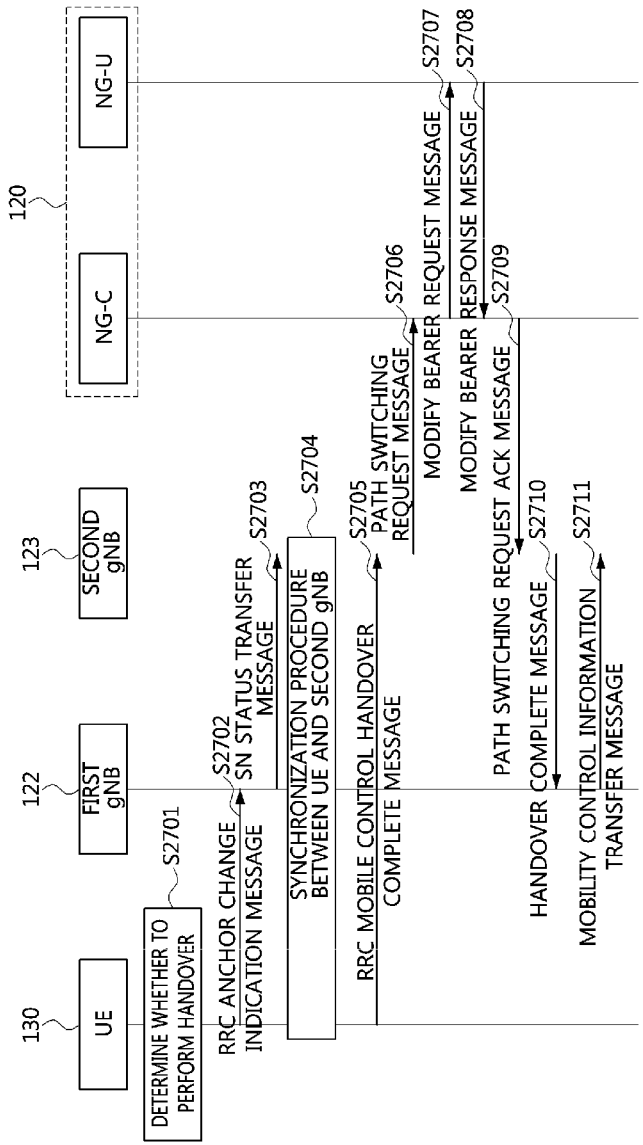
FIG. 27 is a sequence chart illustrating a second embodiment of a handover procedure in the communication system E-1.
Figure 28:
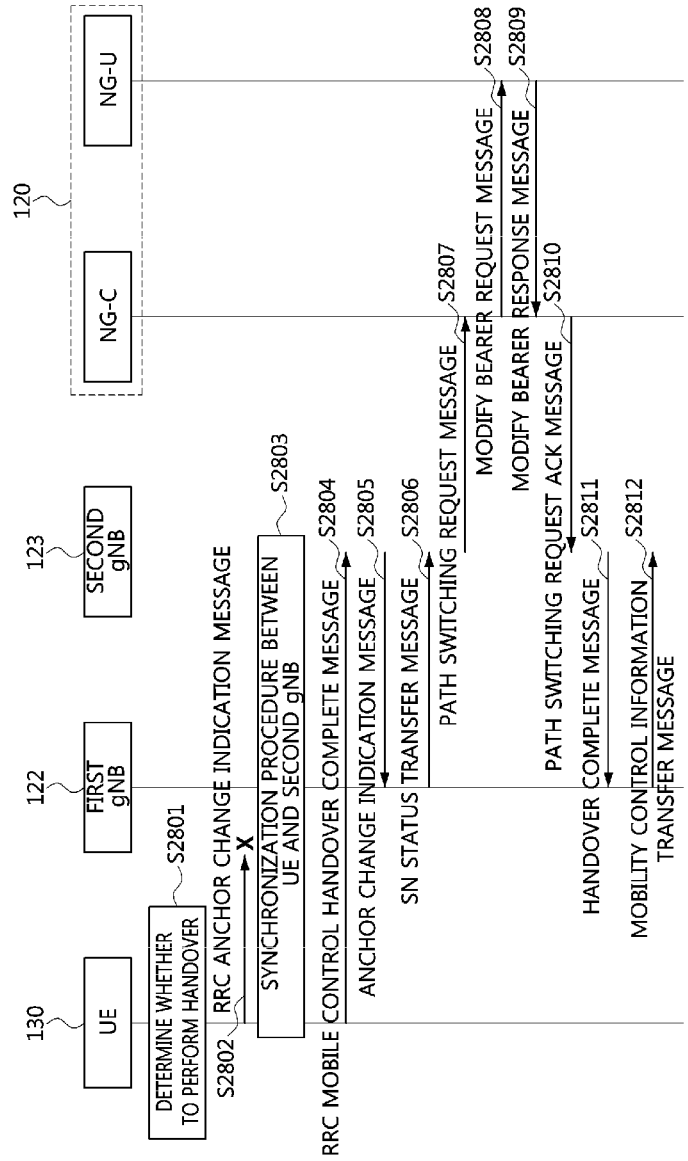
FIG. 28 is a sequence chart illustrating a third embodiment of a handover procedure in the communication system E-1.

Next, when a plurality of gNBs are reserved for a handover procedure (or a RLF recovery procedure) (e.g., when the handover (or RLF recovery) preparation procedure is performed at a plurality of gNBs as shown in FIG. 24), a UE initiated handover procedure will be described. FIG. 27 illustrates a handover procedure when an RRC anchor change indication message transmitted from the UE 130 is received at the first gNB 122, and FIG. 28 illustrates a handover procedure when an RRC anchor change indication message transmitted from the UE 130 is not received at the first gNB 122.

FIG. 27 is a sequence chart illustrating a second embodiment of a handover procedure in the communication system E-1.

Referring to FIG. 27, the communication system E-1 may comprise an NGC 120, a first gNB 122, a second gNB 123, a UE 130, and the like. The NGC 120 may include NG-C and NG-U. Each of the NGC 120, the first gNB 122, the second gNB 123, and the UE 130 may be the same as or similar to each of the NGC 120, the first gNB 122, the second gNB 123, and the UE 130 shown in FIG. 7. The communications between the NG-C and the NG-U may be performed based on the STP-C interface, the communications between the NG-C and the gNB (e.g., the first gNB 122 or the second gNB 123) may be performed based on the NG-C interface, the communications between the gNBs (e.g., the first gNB 122 and the second gNB 123) may be performed based on the Xn-C interface, and the communications between the gNB (e.g., the first gNB 122 or the second gNB 123) and the UE 130 may be performed based on the radio interface. The RRC message used in the RRC signaling procedure may be the same as or similar to the RRC message defined in the 3GPP.

The UE 130 may obtain mobility control information of a plurality of gNBs based on the method shown in FIG. 24. The UE 130 connected to the first gNB 122 may measure signals received from the communication nodes (e.g., the 1-tier and 2-tier base stations from the first gNB 122 in FIG. 23), and determine whether to perform a handover procedure based on the measurement on the signals. For example, when the received signal strength of the second gNB 123 is equal to or greater than the received signal strength of the first gNB 122 or (the received signal strength of the first gNB 122+a predetermined margin), the UE 130 may determine to perform a handover procedure from the first gNB 122 to the second gNB 123. Here, the first gNB 122 may be a source base station, and the second gNB 123 may be a target base station.

When it is determined that the handover procedure from the first gNB 122 to the second gNB 123 is to be performed, the UE 130 may generate an RRC anchor change indication message instructing to perform the handover procedure from the first gNB 122 to the second gNB 123, and transmit the RRC anchor change indication message to the second gNB 122 (S2702). Upon receiving the RRC anchor change indication message from the UE 130, the first gNB 122 may stop transmission of data units to the UE 130, and generate an SN status transfer message. The SN status transfer message may include UL/DL PDCP SN status information. The first gNB 122 may transmit the SN status transfer message to the second gNB 123 using the Xn-C interface (S2703). The first GNB 122 may also transmit data units (e.g., data units received from the UE 130, data units to be transmitted to the UE 130, etc.) to the second gNB 123 using the Xn-C interface. The second gNB 123 may receive the SN status transfer message and the data units from the first gNB 122 and identify the information included in the SN status transfer message.

Meanwhile, after transmitting the RRC anchor change indication message, the UE 130 may perform a handover procedure without confirming reception of the RRC anchor change indication message. For example, the UE 130 may perform a synchronization procedure with the second gNB 123 (S2704). Here, the UE 130 may transmit a random access preamble to the second gNB 123. The second gNB 123 may receive the random access preamble from the UE 130, generate a random access response in response to the random access preamble, and transmit the random access response to the UE 130. The UE 130 may receive the random access response from the second gNB 123. That is, the UE 130 may synchronize with the second gNB 123 by performing the random access procedure with the second gNB 123.

Then, the UE 130 may generate an RRC mobile control handover complete message, and transmit the RRC mobile control handover complete message to the second gNB 123 (S2705). The RRC mobile control handover complete message may indicate completion of the handover procedure. Upon receiving the RRC mobile control handover complete message from the UE 130, the second gNB 123 may perform a path switching procedure with the NGC 120. For example, the second gNB 123 may generate a path switching request message informing that the cell to which the UE 130 is connected is changed, and transmit the path switching request message to the NG-C using the NG-C interface (S2706). When the path switching request message is received from the second gNB 123, the NG-C may confirm that the cell to which the UE 130 is connected is changed and may generate a modify bearer request message. The NG-C may transmit the modify bearer request message to the NG-U using the STP-C interface (S2707).

The NG-U may receive the modify bearer request message from the NG-C and perform an operation based on the modify bearer request message. The NG-U may then generate a modify bearer response message in response to the modify bearer request message and transmit the modify bearer response message to the NG-C using the STP-C interface (S2708). When the modify bearer response message is received from the NG-U, the NG-C may determine that the modification of bearer is complete and may generate a path switching request ACK message. The NG-C may transmit the path switching request ACK message to the second gNB 123 using the NG-C interface (S2709).

When the path switching request ACK message is received from the NG-C, the second gNB 123 may determine that the path switching procedure is completed. Thereafter, the second gNB 123 may generate a handover complete message and transmit the handover complete message to the first gNB 122 using the Xn-C interface (S2710). When the handover complete message is received from the second gNB 123, the first gNB 122 may generate a mobility control information transfer message including the mobility control information, and transmit the mobility control information transfer message to the second gNB 123 using the Xn-C interface (S2711). The mobility control information included in the mobility control information transfer message may be the mobility control information obtained by the method shown in FIG. 24. When the mobility control information transfer message is received from the first gNB 122, the second gNB 123 may identify the information included in the mobility control information transfer message. Also, the second gNB 123 may update (add, change, or delete) the mobility control information by performing the steps S2403 to S2405 shown in FIG. 24 or the steps S2503 to S2505 shown in FIG. 25 based on the mobility control information transfer message.

FIG. 28 is a sequence chart illustrating a third embodiment of a handover procedure in the communication system E-1.

Referring to FIG. 28, the communication system E-1 may comprise an NGC 120, a first gNB 122, a second gNB 123, a UE 130, and the like. The NGC 120 may include NG-C and NG-U. Each of the NGC 120, the first gNB 122, the second gNB 123, and the UE 130 may be the same as or similar to each of the NGC 120, the first gNB 122, the second gNB 123, and the UE 130 shown in FIG. 7. The communications between the NG-C and the NG-U may be performed based on the STP-C interface, the communications between the NG-C and the gNB (e.g., the first gNB 122 or the second gNB 123) may be performed based on the NG-C interface, the communications between the gNBs (e.g., the first gNB 122 and the second gNB 123) may be performed based on the Xn-C interface, and the communications between the gNB (e.g., the first gNB 122 or the second gNB 123) and the UE 130 may be performed based on the radio interface. The RRC message used in the RRC signaling procedure may be the same as or similar to the RRC message defined in the 3GPP.

The UE 130 may obtain mobility control information of a plurality of gNBs based on the method shown in FIG. 24. The UE 130 connected to the first gNB 122 may measure signals received from the communication nodes (e.g., the 1-tier and 2-tier base stations from the first gNB 122 in FIG. 23), and determine whether to perform a handover procedure based on the measurement on the signals (S2801). For example, when the received signal strength of the second gNB 123 is equal to or greater than the received signal strength of the first gNB 122 or (the received signal strength of the first gNB 122+a predetermined margin), the UE 130 may determine to perform a handover procedure from the first gNB 122 to the second gNB 123. Here, the first gNB 122 may be a source base station, and the second gNB 123 may be a target base station.

When it is determined that the handover procedure from the first gNB 122 to the second gNB 123 is to be performed, the UE 130 may generate an RRC anchor change indication message instructing to perform the handover procedure from the first gNB 122 to the second gNB 123, and transmit the RRC anchor change indication message to the first gNB 122 (S2802). The first gNB 122 may not receive the RRC anchor change indication message. In this case, the first gNB 122 may continue to transmit data units to and receive data units from the UE 130.

Meanwhile, after transmitting the RRC anchor change indication message, the UE 130 may perform a handover procedure without confirming reception of the RRC anchor change indication message. For example, the UE 130 may perform a synchronization procedure with the second gNB 123 (S2803). Here, the UE 130 may transmit a random access preamble to the second gNB 123. The second gNB 123 may receive the random access preamble from the UE 130, generate a random access response in response to the random access preamble, and transmit the random access response to the UE 130. The UE 130 may receive the random access response from the second gNB 123. That is, the UE 130 may synchronize with the second gNB 123 by performing the random access procedure with the second gNB 123.

Then, the UE 130 may generate an RRC mobile control handover complete message, and transmit the RRC mobile control handover complete message to the second gNB 123 (S2804). The RRC mobile control handover complete message may indicate completion of the handover procedure. When the RRC mobile control handover complete message is received from the UE 130, the second gNB 123 may confirm that the handover procedure from the first gNB 122 to the second gNB 123 is performed. Since the second gNB 123 has not received a SN status transfer message from the first gNB 122, the second gNB 123 may generate an anchor change indication message requesting transmission of the SN status transfer message. Also, the anchor change indication message may indicate that the handover procedure from the first gNB 122 to the second gNB 123 is performed. The second gNB 123 may transmit the anchor change indication message to the first gNB 122 using the Xn-C interface (S2805).

When the RRC anchor change indication message is received from the second gNB 123, the first gNB 122 may confirm that the handover procedure from the first gNB 122 to the second gNB 123 is performed. Thus, the first gNB 122 may stop transmission of data units to the UE 130, and generate an SN status transfer message. The SN status transfer message may include UL/DL PDCP SN status information. The first gNB 122 may transmit the SN status transfer message to the second gNB 123 using the Xn-C interface (S2806). The first GNB 122 may also transmit data units (e.g., data units received from the UE 130, data units to be transmitted to the UE 130, etc.) to the second gNB 123 using the Xn-C interface. The second gNB 123 may receive the SN status transfer message and the data units from the first gNB 122 and identify the information included in the SN status transfer message.

Thereafter, the second gNB 123 may perform a path switching procedure with the NGC 120. For example, the second gNB 123 may generate a path switching request message informing that the cell to which the UE 130 is connected is changed, and transmit the path switching request message to the NG-C using the NG-C interface (S2807). When the path switching request message is received from the second gNB 123, the NG-C may confirm that the cell to which the UE 130 is connected is changed and may generate a modify bearer request message. The NG-C may transmit the modify bearer request message to the NG-U using the STP-C interface (S2808).

The NG-U may receive the modify bearer request message from the NG-C and perform an operation based on the modify bearer request message. The NG-U may then generate a modify bearer response message in response to the modify bearer request message and transmit the modify bearer response message to the NG-C using the STP-C interface (S2809). When the modify bearer response message is received from the NG-U, the NG-C may determine that the modification of bearer is complete and may generate a path switching request ACK message. The NG-C may transmit the path switching request ACK message to the second gNB 123 using the NG-C interface (S2810).

When the path switching request ACK message is received from the NG-C, the second gNB 123 may determine that the path switching procedure is completed. Thereafter, the second gNB 123 may generate a handover complete message and transmit the handover complete message to the first gNB 122 using the Xn-C interface (S2811). When the handover complete message is received from the second gNB 123, the first gNB 122 may generate a mobility control information transfer message including the mobility control information, and transmit the mobility control information transfer message to the second gNB 123 using the Xn-C interface (S2812). The mobility control information included in the mobility control information transfer message may be the mobility control information obtained by the method shown in FIG. 24. When the mobility control information transfer message is received from the first gNB 122, the second gNB 123 may identify the information included in the mobility control information transfer message. Also, the second gNB 123 may update (add, change, or delete) the mobility control information by performing the steps S2403 to S2405 shown in FIG. 24 or the steps S2503 to S2505 shown in FIG. 25 based on the mobility control information transfer message.

Next, when a plurality of gNBs are reserved for a handover procedure (or a RLF recovery procedure) (e.g., when the handover (or RLF recovery) preparation procedure is performed at a plurality of gNBs as shown in FIG. 24), a UE initiated RLF recovery procedure will be described.

Figure 29:
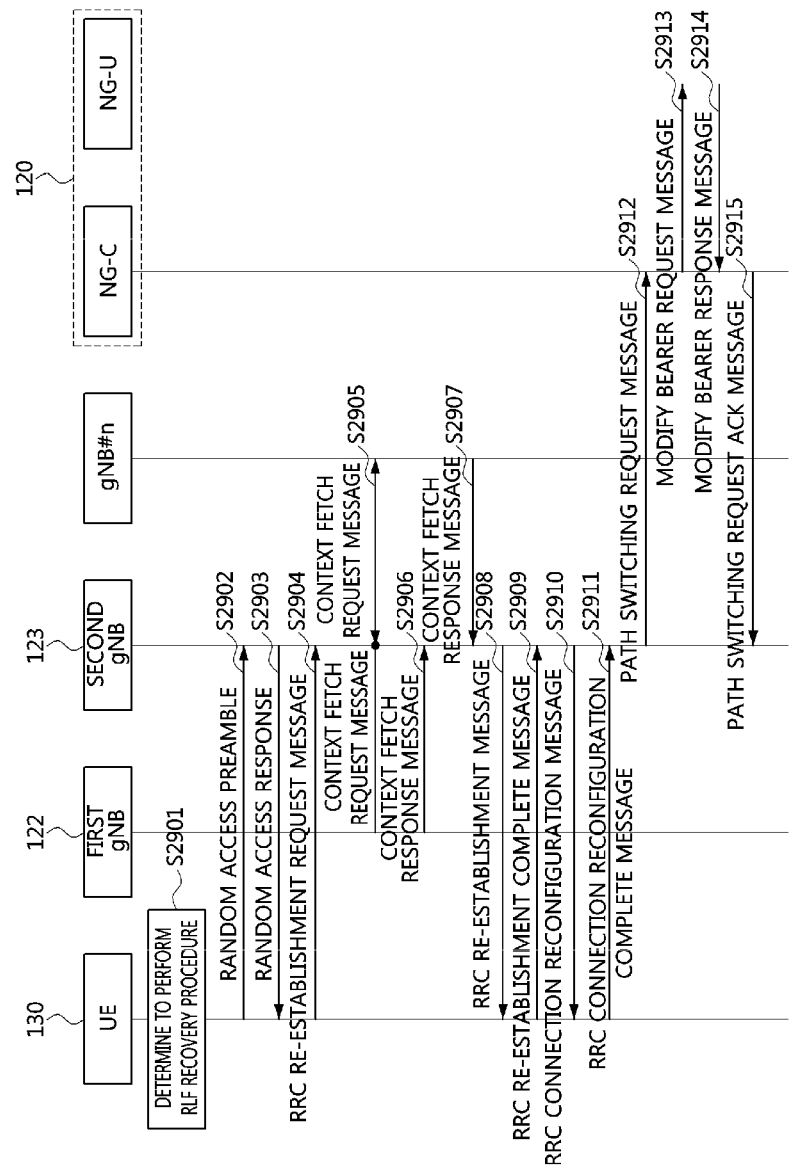
FIG. 29 is a sequence chart illustrating a first embodiment of a RLF recovery procedure in the communication system E-1.

FIG. 29 is a sequence chart illustrating a first embodiment of a RLF recovery procedure in the communication system E-1.

Referring to FIG. 29, the communication system E-1 may comprise an NGC 120, a first gNB 122, a second gNB 123, an n-th gNB, a UE 130, and the like. The NGC 120 may include NG-C and NG-U. Each of the NGC 120, the first gNB 122, the second gNB 123, and the UE 130 may be the same as or similar to each of the NGC 120, the first gNB 122, the second gNB 123, and the UE 130 shown in FIG. 7. Each of the first gNB 122, the second gNB 123, and the n-th gNB may form the cell shown in FIG. 23. The n-th gNB may be one of the third to nineteenth gNBs. The communications between the NG-C and the NG-U may be performed based on the STP-C interface, the communications between the NG-C and the gNB (e.g., the first gNB 122, the second gNB 123, or the n-th gNB) may be performed based on the NG-C interface, the communications between the gNBs (e.g., the first gNB 122, the second gNB 123, or the n-th gNB) may be performed based on the Xn-C interface, and the communications between the gNB (e.g., the first gNB 122, the second gNB 123, or the n-th gNB) and the UE 130 may be performed based on the radio interface. The RRC message used in the RRC signaling procedure may be the same as or similar to the RRC message defined in the 3GPP.

The UE 130 may be connected to the first gNB 122 and may obtain mobility control information of a plurality of gNBs based on the method shown in FIG. 24. When an RLF is detected in the radio interface between the UE 130 and the first gNB 122, the UE 130 may determine to perform a RLF recovery procedure (S2901). The UE 130 may select a target base station (e.g., a base station to be recovered by the RLF recovery procedure) based on the mobility control information. Here, the target base station may be selected based on the received signal strength, the capacity of the base station, and the like. When the second gNB 123 is selected as the target base station, the UE 130 may transmit a random access preamble to the second gNB 123 (S2902). The second gNB 123 may then receive the random access preamble from the UE 130 and transmit a random access response to the UE 130 in response to the random access preamble (S2903). The UE 130 may receive the random access response from the second gNB 123. The UE 130 may synchronize with the second gNB 123 by performing the steps S2902 and S2903.

Thereafter, the UE 130 may generate an RRC re-establishment request message and transmit the RRC re-establishment request message to the second gNB 123 (S2904). The RRC re-establishment request message may include an identifier of the UE 130 or the like. When the RRC re-establishment request message is received from the UE 130, the second gNB 123 may confirm that the RLF recovery procedure for the UE 130 is requested based on the RRC re-establishment request message. The second gNB 123 may confirm whether there is mobility control information configured for the UE 130 (e.g., information reserved according to the preparation procedure shown in FIG. 24).

If the mobility control information configured for the UE 130 is not present in the second gNB 123, steps S2905 to S2907 below may be performed. For example, the second gNB 123 may generate a context fetch request message and transmit the context fetch request message to neighboring base stations using the Xn-C interface (S2905). The context fetch request message may include an identifier of the UE 130 or the like and may be used to discovery a base station that has operated as a serving base station of the UE 130.

In the following description, it is assumed that the context fetch request message is received at the first gNB 122 and the n-th gNB. When the context fetch request message is received from the second gNB 123, each of the first gNB 122 and the n-th gNB may identify whether it has operated as a serving base station of the UE 130 (e.g., whether or not to have the mobility control information configured for the UE 130). Each of the first gNB 122 and the n-th gNB may generate a context fetch response message including the identification result. In case that the first gNB 122 has operated as a serving base station of the UE 130, the first gNB 122 may generate a context fetch response message including an indicator indicating that the first gNB 122 has operated as a serving base station of the UE 130, context information of the UE 130, and the like. The first gNB 122 may transmit the context fetch response message to the second gNB 123 using the Xn-C interface (S2906).

On the other hand, in case that the n-th gNB has not operated as a serving base station of the UE 130, the n-th gNB may generate a context fetch response message including an indicator indicating that the n-th gNB has not operated as a serving base station of the UE 130. The n-th gNB may transmit the context fetch response message to the second gNB 123 using the Xn-C interface (S2907). The second gNB 123 may receive the context fetch response messages from the first gNB 122 and the n-th gNB, and obtain the context information of the UE 130 from the context fetch response message received from the first gNB 122.

Meanwhile, when the mobility control information configured for the UE 130 exists in the second gNB 123 or obtained through the steps S2905 to S2907, steps S2908 to S2911 below may be performed. For example, the second gNB 123 may transmit an RRC re-establishment message to the UE 130 (S2908). The UE 130 may receive the RRC re-establishment message from the second gNB 123 and perform an operation based on the received RRC re-establishment message. Thereafter, the UE 130 may transmit an RRC re-establishment complete message to the second gNB 123 (S2909). When the RRC re-establishment complete message is received from the UE 130, the second gNB 123 may determine that the re-establishment procedure is completed. In this case, the second gNB 123 may transmit an RRC connection reconfiguration message to the UE 130 (S2910). The UE 130 may receive the RRC connection reconfiguration message from the second gNB 123 and perform an operation based on the received RRC connection reconfiguration message. Thereafter, the UE 130 may transmit an RRC connection reconfiguration complete message to the second gNB 123 (S2911). When the RRC connection reconfiguration complete message is received from the UE 130, the second gNB 123 may determine that the connection reconfiguration procedure is completed. Therefore, the radio link between the UE 130 and the second gNB 123 may be recovered by performing the steps S2908 to S2911.

On the other hand, when the mobility control information configured for the UE 130 does not exist in the second gNB 123 or when the mobility control information configured for the UE 130 exists in the second gNB 123 but the second gNB 123 has not operated as a serving base station of the UE 130, a path switching procedure (e.g., steps S2912 to S2915 below) may be further performed after the radio link between the UE 130 and the second gNB 123 is recovered. For example, the second gNB 123 may generate a path switching request message informing that the cell to which the UE 130 is connected is changed, and transmit the path switching request message to the NG-C using the NG-C interface (S2912). When the path switching request message is received from the second gNB 123, the NG-C may confirm that the cell to which the UE 130 is connected is changed and may generate a modify bearer request message. The NG-C may transmit the modify bearer request message to the NG-U using the STP-C interface (S2913).

The NG-U may receive the modify bearer request message from the NG-C and perform an operation based on the modify bearer request message. The NG-U may then generate a modify bearer response message in response to the modify bearer request message and transmit the modify bearer response message to the NG-C using the STP-C interface (S2914). When the modify bearer response message is received from the NG-U, the NG-C may determine that the modification of bearer is complete and may generate a path switching request ACK message. The NG-C may transmit the path switching request ACK message to the second gNB 123 using the NG-C interface (S2915). Therefore, through the above-described path switching procedure, the communication path of (second gNB 123-NGC 120) may be re-established. Also, after the completion of the step S2911 or the step S2915, the second gNB 123 may update (add, change, or delete) the mobility control information by performing the steps S2403 to S2405 shown in FIG. 24 (or the steps S2503 to S2505 shown in FIG. 25).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system including the terminal, a master base station, a first slave base station, and a second slave base station, the operation method comprising:

when the terminal is connected to the master base station and the first slave base station, transmitting a radio resource control (RRC) measurement report message including channel state information measured by the terminal to the first slave base station via the master base station which receives the RRC measurement report message from the terminal and transmits the RRC measurement report message to the first slave base station;

when a handover procedure from the first slave base station to the second slave base station is determined to be performed based on the RRC measurement report message, receiving an RRC connection reconfiguration message indicating execution of the handover procedure from the first slave base station via the master base station which receives the RRC connection reconfiguration message from the first slave base station and transmits the RRC connection reconfiguration message to the terminal; and establishing a first communication path between the terminal and the second slave base station by performing the handover procedure based on the RRC connection reconfiguration message, wherein the first slave base station corresponds to a serving base station in the handover procedure, the second slave base station corresponds to a target base station in the handover procedure, the master base station is not both the serving base station and the target base station in the handover procedure, the RRC measurement report message is transmitted from the master base station to the first slave base station via a second communication path established between the master base station and the first slave base station, the RRC connection reconfiguration message is generated by the first slave base station, and the RRC connection reconfiguration message is transmitted from the first slave base station to the master base station via the second communication path.

2. The operation method according to claim 1, further comprising transmitting an RRC connection reconfiguration complete message indicating completion of the handover procedure to the second slave base station via the master base station, wherein the RRC connection reconfiguration complete message is transmitted from the master base station to the second slave base station via a third communication path established between the master base station and the second slave base station.

3. The operation method according to claim 1, wherein communications between the terminal and the master base station are performed using a frequency band other than a millimeter wave band, and communications between the terminal and the first slave base station and communications between the terminal and the second slave base station are performed using the millimeter wave band.

4. The operation method according to claim 1, wherein, when the first communication path is established, at least one data radio bearer (DRB) between the terminal and the second slave base station and at least one general packet radio service (GPRS) tunneling protocol (GTP)-U tunnel between the second slave base station and an evolved packet core (EPC) of the communication system are established.

5. The operation method according to claim 1, wherein the second communication path is mapped to a data radio bearer (DRB) established between the terminal and the master base station, and the RRC measurement report message and the RRC connection reconfiguration message are transmitted and received through the DRB.

6. The operation method according to claim 1, wherein communications between the master base station and the first slave base station and communications between the master base station and the second slave base station are performed based on user datagram protocol (UDP).

* * * * *